US012688815B2

(12) United States Patent
Zhang

(10) Patent No.: US 12,688,815 B2
(45) Date of Patent: Jul. 21, 2026

(54) PIXEL CIRCUIT, DISPLAY PANEL, AND DISPLAY DEVICE WITH REDUCED FLICKERING OF IMAGE

(71) Applicant: Wuhan Tianma Micro-Electronics Co., Ltd., Wuhan (CN)

(72) Inventor: Wenshuai Zhang, Wuhan (CN)

(73) Assignee: Wuhan Tianma Micro-Electronics Co., Ltd., Wuhan (CN)

( * ) Notice: Subject to any disclaimer, the term of this patent is extended or adjusted under 35 U.S.C. 154(b) by 16 days.

(21) Appl. No.: 18/237,572

(22) Filed: Aug. 24, 2023

(65) Prior Publication Data

US 2024/0296783 A1 Sep. 5, 2024

(30) Foreign Application Priority Data

Mar. 3, 2023 (CN) ......................... 202310231138.1

(51) Int. Cl.
*G09G 3/32* (2016.01)

(52) U.S. Cl.
CPC ....... *G09G 3/32* (2013.01); *G09G 2300/0819* (2013.01); *G09G 2310/0264* (2013.01); *G09G 2310/062* (2013.01); *G09G 2320/0233* (2013.01)

(58) Field of Classification Search
CPC ............. G09G 3/32; G09G 2300/0819; G09G 2310/0264; G09G 2310/062; G09G 2320/0233; G09G 3/3233; G09G 3/3208; G09G 2320/0247
See application file for complete search history.

(56) References Cited

U.S. PATENT DOCUMENTS

2017/0103706 A1* 4/2017 Yang ........................ G06F 3/044
2017/0110056 A1* 4/2017 Hu ........................ G09G 3/3258
2017/0169789 A1* 6/2017 Liao ........................ G09G 3/38
2018/0226027 A1* 8/2018 Wang ................... G09G 3/3258
2020/0388217 A1* 12/2020 Yuan .................... G09G 3/3233
2023/0042030 A1* 2/2023 Zhang ...................... G09G 3/20

FOREIGN PATENT DOCUMENTS

CN 112150967 A 12/2020
CN 112908246 A 6/2021
CN 114078445 A 2/2022
CN 114495836 A 5/2022
CN 115273737 A 11/2022

* cited by examiner

*Primary Examiner* — David D Davis
(74) *Attorney, Agent, or Firm* — Anova Law Group, PLLC

(57) ABSTRACT

A pixel circuit, a display panel, and a display device are provided. The pixel circuit includes a driving module and a bias compensation module. A control terminal of the bias compensation module is electrically connected to a first control signal line, a first terminal of the bias compensation module is electrically connected to a target signal line, a second terminal of the bias compensation module is electrically connected to a first terminal of the driving module or a second terminal of the driving module, and the target signal line is electrically connected to a first periodic signal.

19 Claims, 15 Drawing Sheets

PIXEL CIRCUIT, DISPLAY PANEL, AND DISPLAY DEVICE WITH REDUCED FLICKERING OF IMAGE

CROSS-REFERENCE TO RELATED APPLICATION

This application claims priority of Chinese Patent Application No. 202310231138.1, filed on Mar. 3, 2023, the entire content of which is hereby incorporated by reference.

FIELD OF THE DISCLOSURE

The present disclosure generally relates to the field of display technology and, more particularly, relates to a pixel circuit, a display panel, and a display device.

BACKGROUND

FIG. 1 illustrates a schematic diagram of Id-Vg curve drift of a driving module in a pixel circuit, with Id referring to drain current and Vg referring to gate voltage. As shown in FIG. 1, in a non-bias phase such as a light-emitting phase of a pixel circuit, potential of a control terminal of a driving module may be greater than potential of a second terminal of the driving module. When the driving module is in such a state for a long-term, ion polarization may appear inside the driving module, and then a built-in electric field may be formed inside the driving module. As a result, a threshold voltage Vth of the driving module may be continuously increased, causing the Id-Vg curve to shift. As a result, driving current flowing into a light-emitting element may be affected, and display uniformity may thus be affected. For example, when a black screen is switched to a white screen, display brightness may rise slowly. After 4-5 frames of data refreshing, the brightness may become stable. Due to the long recovery time, human eyes may perceive flickers of images.

SUMMARY

One aspect of the present disclosure includes a pixel circuit. The pixel circuit includes a driving module and a bias compensation module. A control terminal of the bias compensation module is electrically connected to a first control signal line, a first terminal of the bias compensation module is electrically connected to a target signal line, a second terminal of the bias compensation module is electrically connected to a first terminal of the driving module or a second terminal of the driving module, and the target signal line is electrically connected to a first periodic signal.

Another aspect of the present disclosure includes a display panel. The display panel includes a plurality of rows of pixel circuits. Each row of the plurality of rows of pixel circuits includes a pixel circuit. The pixel circuit includes a driving module and a bias compensation module. A control terminal of the bias compensation module is electrically connected to a first control signal line, a first terminal of the bias compensation module is electrically connected to a target signal line, a second terminal of the bias compensation module is electrically connected to a first terminal of the driving module or a second terminal of the driving module, and the target signal line is electrically connected to a first periodic signal.

Another aspect of the present disclosure includes a display device. The display device includes a display panel. The display panel includes a plurality of rows of pixel circuits. Each row of the plurality of rows of pixel circuits includes a pixel circuit. The pixel circuit includes a driving module and a bias compensation module. A control terminal of the bias compensation module is electrically connected to a first control signal line, a first terminal of the bias compensation module is electrically connected to a target signal line, a second terminal of the bias compensation module is electrically connected to a first terminal of the driving module or a second terminal of the driving module, and the target signal line is electrically connected to a first periodic signal.

Other aspects of the present disclosure may be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
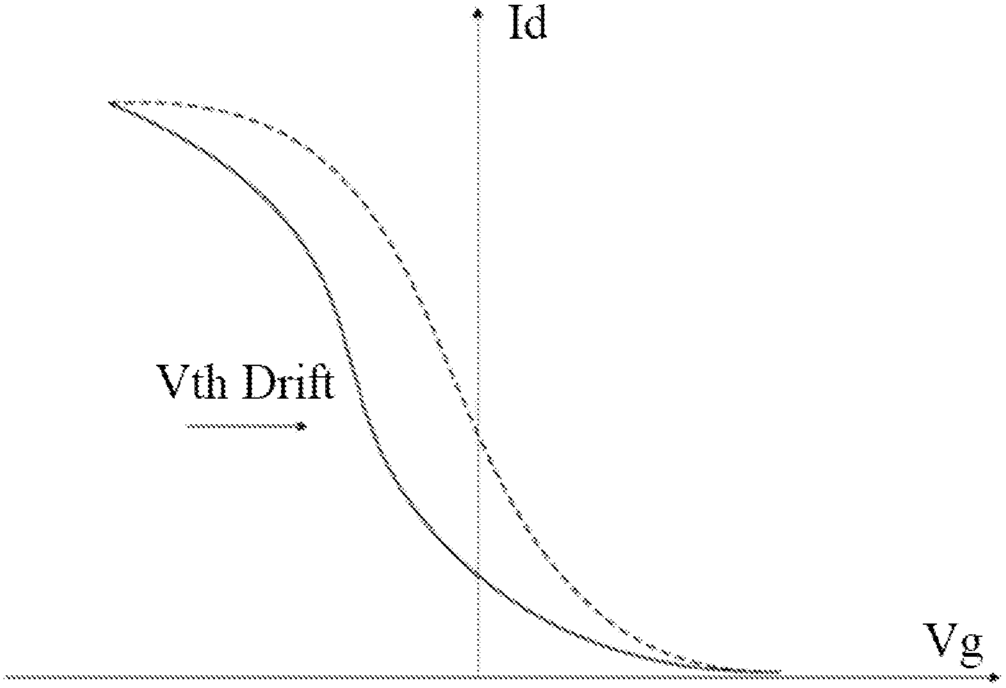
FIG. 1 illustrates a schematic diagram of Id-Vg curve drift of a driving module in a pixel circuit.

To make the objectives, technical solutions and advantages of the present disclosure clearer and more explicit, the present disclosure is described in further detail with accompanying drawings and embodiments. It should be understood that the specific exemplary embodiments described herein are only for explaining the present disclosure and are not intended to limit the present disclosure.

Technologies, methods, and equipment known to those of ordinary skill in relevant fields may not be discussed in detail, but where appropriate, these technologies, methods, and equipment should be regarded as part of the specification.

In the present disclosure, relational terms, such as “first” and “second”, are used only to distinguish one entity or operation from another without necessarily requiring or implying any such actual relationship or order between these entities or operations. Moreover, terms “comprises”, “comprises” or any other variations thereof are intended to present a non-exclusive inclusion. A process, method, article, or apparatus comprising a set of elements may include not only the set of elements, but also other elements not expressly listed or elements inherent in the process, method, article or apparatus. Without further limitations, an element defined by a statement “comprising . . . ” does not exclude presence of additional same elements in the process, method, article, or apparatus.

In the present disclosure, association relationships of associated objects described by term “and/or” may include three relationships. For example, “A and/or B” may mean that A exists alone, A and B exist simultaneously, and B exists alone. In addition, the character “/” generally indicates an “or” relationship of associated objects.

Reference will now be made in detail to embodiments of the present disclosure, which are illustrated in the accompanying drawings. Similar labels and letters designate similar items in the drawings. Once an item is defined in one drawing, the item may not be defined and discussed in subsequent drawings.

It should be noted that, in the present disclosure, transistors may be N-type transistors or P-type transistors. For an N-type transistor, the on-level has a high potential, and the off-level has low potential. That is, when a control terminal of an N-type transistor is at a high potential, conduction between a first terminal and a second terminal is turned on, and when the control terminal of the N-type transistor is at a low potential, the conduction between the first terminal and the second terminal is turned off. For a P-type transistor, the on-level has a low potential, and the off-level has a high potential. That is, when the control terminal of a P-type transistor is at a low potential, the conduction between the first terminal and the second terminal is turned on, and when the control terminal of the P-type transistor is at a high potential, the conduction between the first terminal and the second terminal is turned off. During a specific implementation, a gate of a transistor may be used as the control terminal. In addition, according to the gate signal and the type of the transistor, the first terminal may be used as a source and the second terminal may be used as a drain, or the first terminal may be used as a drain and the second terminal may be used as a source. In addition, in the present disclosure, the on-level and off-level are general concepts. The on-level refers to a potential that may turn on the transistor, and the off-level refers to a potential that may turn off the transistor.

In the present disclosure, the term “electrical connection” may refer to direct electrical connection between two components, or may refer to electrical connection between two components via one or more other components.

In the present disclosure, a first node, a second node and a third node are defined only for convenience of describing a circuit structure. The first node, the second node and the third node are not actual circuit units.

FIG. 1 illustrates a schematic diagram of Id-Vg curve drift of a driving module in a pixel circuit. As shown in FIG. 1, in a non-bias phase such as a light-emitting phase of a pixel circuit, potential of a control terminal of a driving module may be greater than potential of a second terminal of the driving module. When the driving module is in such a state for a long-term, ion polarization may appear inside the driving module, and then a built-in electric field may be formed inside the driving module. As a result, a threshold voltage Vth of the driving module may be continuously increased, causing the Id-Vg curve to shift. As a result, driving current flowing into a light-emitting element may be affected, and display uniformity may thus be affected. For example, when a black screen is switched to a white screen, display brightness may rise slowly. After 4-5 frames of data refreshing, the brightness may become stable. Due to the long recovery time, human eyes may perceive flickers of images.

In existing technologies, an additional bias compensation signal (DVH signal) may be used to adjust a second terminal potential of a driving module, and then a threshold voltage Vth of the driving module. However, in existing technologies, the additional bias compensation signal is usually a constant voltage signal, that is, a voltage signal with fixed potential. As such, adjustment requirements of the threshold voltage of the driving module in different situations may not be met.

To address the above technical problems, the present disclosure provides a pixel circuit, a display panel, and a display device, The present disclosure is based on the following technical ideas. A control terminal of a bias compensation module in a pixel circuit may be electrically connected to a first control signal line. A first terminal of the bias compensation module may be electrically connected to a target signal line. A second terminal of the bias compensation module may be electrically connected to a first terminal of the driving module or a second terminal of the driving module. The target signal line may be electrically connected to a first periodic signal. The first periodic signal may be used to adjust the potential of the second terminal of the driving module, and thus adjust a threshold voltage of the driving module.

In this way, on the one hand, the bias compensation module may transmit the first periodic signal of the target signal line to the first terminal of the driving module or the second terminal of the driving module. The potential difference between the second terminal of the drive module and the control terminal may be improved, the ion polarization level inside the drive module may be weakened, the threshold voltage of the driving module may be reduced, and the bias state of the threshold voltage of the driving module may be adjusted. On the other hand, the target signal line may provide the first periodic signal. When adjusting the threshold voltage of the driving module, a voltage signal of any voltage value in the first periodic signal or a combination of a plurality of voltage signals with different voltage values may be selected to adjust the threshold voltage of the driving module. Accordingly, adjustment requirements of the threshold voltage of the driving module in different situations may be met.

Figure 2:
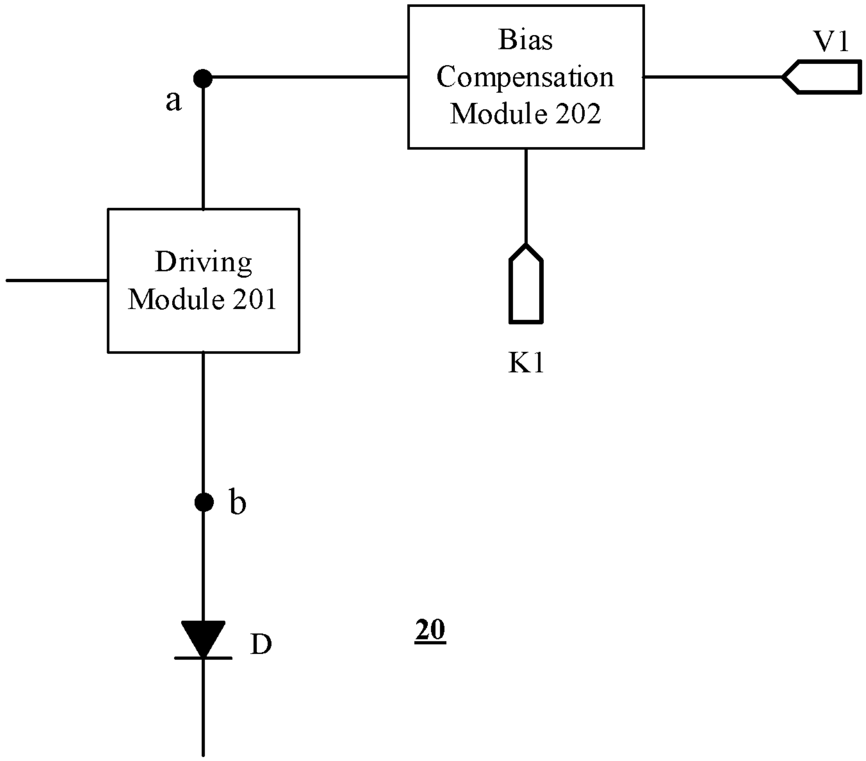
FIG. 2 illustrates a schematic circuit diagram of a pixel circuit consistent with the disclosed embodiments of the present disclosure.

FIG. 2 illustrates a schematic circuit diagram of a pixel circuit consistent with the disclosed embodiments of the present disclosure. As shown in FIG. 2, in one embodiment of the present disclosure, the pixel circuit 20 may include a driving module 201 and a bias compensation module 202. The driving module 201 may be configured to drive a light emitting element D to emit light. Exemplarily, the light emitting element D includes, but is not limited to, an organic light emitting diode (OLED), an inorganic light emitting diode (LED), or a quantum dot (QD). The inorganic light emitting diodes may include but are not limited to mini light emitting diodes (mini LEDs), micro light emitting diodes (micro LEDs), and quantum dot light emitting diodes (QLEDs).

A control terminal of the bias compensation module 202 is electrically connected to a first control signal line K1. A first terminal of the bias compensation module 202 is electrically connected to a target signal line V1. A second terminal of the bias compensation module 202 is electrically connected to a first terminal a of the driving module 201 or a second terminal b of the driving module. In one embodiment, when the driving module 201 is a thin film transistor (TFT), the first terminal a of the driving module 201 may be a source of the thin film transistor, and the second terminal b of the driving module may be a drain of the thin film transistor. In some other embodiments, the first terminal a of the driving module 201 may be the drain of the thin film transistor, and the second terminal b of the driving module may be the source of the thin film transistor.

In one embodiment, the target signal line V1 is electrically connected to the first periodic signal. In other words, the target signal line V1 is configured to transmit a first periodic signal. Exemplarily, the first periodic signal may include a pulse signal. The present disclosure does not limit shapes of the pulse signal. The pulse signal may include but is not limited to a rectangular pulse signal, a sine signal, a cosine signal, or the like.

Optionally, when the bias compensation module 202 is turned on, the driving module 201 is also in a turned-on state. Accordingly, no matter whether the first periodic signal is transmitted to the first terminal a of the driving module 201 or the second terminal b of the driving module 201, the first periodic signal may finally be transmitted to the second terminal b of the driving module 201. As an example for illustration purposes, in FIG. 2, the second terminal of the bias compensation module 202 is electrically connected to the first terminal a of the driving module 201. It may be understood that the second terminal b of the bias compensation module 202 may also be electrically connected to the second terminal b of the driving module 201.

On the one hand, the bias compensation module 202 may transmit the first periodic signal of the target signal line V1 to the first terminal of the driving module 201 or the second terminal of the driving module. The potential difference between the second terminal of the drive module and the control terminal of the drive module may be improved, and the level of ion polarization inside the drive module may be weakened. The threshold voltage of the driving module may be reduced, and the bias state of the threshold voltage of the driving module may be adjusted. Accordingly, problems of low brightness and poor brightness uniformity of a first frame may be addressed.

On the other hand, the target signal line V1 provides the first periodic signal. When adjusting the threshold voltage of the driving module, a voltage signal of any voltage value in the first periodic signal or a combination of a plurality of voltage signals with different voltage values may be selected to adjust the threshold voltage of the driving module. Accordingly, adjustment requirements of the threshold voltage of the driving module in different situations may be met.

Figure 3:
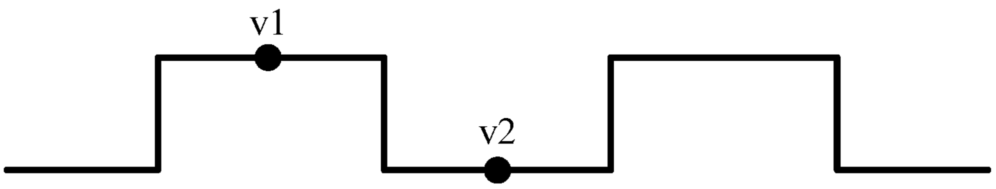
FIG. 3 illustrates a schematic diagram of a first periodic signal consistent with the disclosed embodiments of the present disclosure.

FIG. 3 illustrates a schematic diagram of a first periodic signal consistent with the disclosed embodiments of the present disclosure. For example, as shown in FIG. 3, when adjusting the threshold voltage of the driving module, a voltage signal with a first voltage value v1 in the first periodic signal may be selected to adjust the threshold voltage of the driving module. A voltage signal with a second voltage value v2 in the first periodic signal may also be selected to adjust the threshold voltage of the driving module. The threshold voltage of the driving module may also be adjusted for a plurality of times by using a combination of the voltage signal with the first voltage value v1 and the voltage signal with the second voltage value v2. Accordingly, adjustment requirements of the threshold voltage of the driving module in different situations may be met.

In one embodiment, the first voltage value v1 and the second voltage value v2 may each be greater than 0V. That is, the first voltage value v1 and the second voltage value v2 may each be positive voltage values. In some other embodiments, the first voltage value v1 and the second voltage value v2 may each be less than 0V. That is, the first voltage value v1 and the second voltage value v2 may each be negative voltage values. In some other embodiments, the first voltage value v1 may be greater than 0V, and the second voltage value v2 may be less than 0V. That is, the first voltage value v1 may be a positive voltage value, and the second voltage value v2 may be a negative voltage value. In some other embodiments, the first voltage value v1 may be less than 0V, and the second voltage value v2 may be greater than 0V. That is, the first voltage value v1 may be a negative voltage value, and the second voltage value v2 may be a positive voltage value. The present disclosure does not limit whether the first voltage value v1 and the second voltage value v2 are greater or less than 0V.

Figure 4:
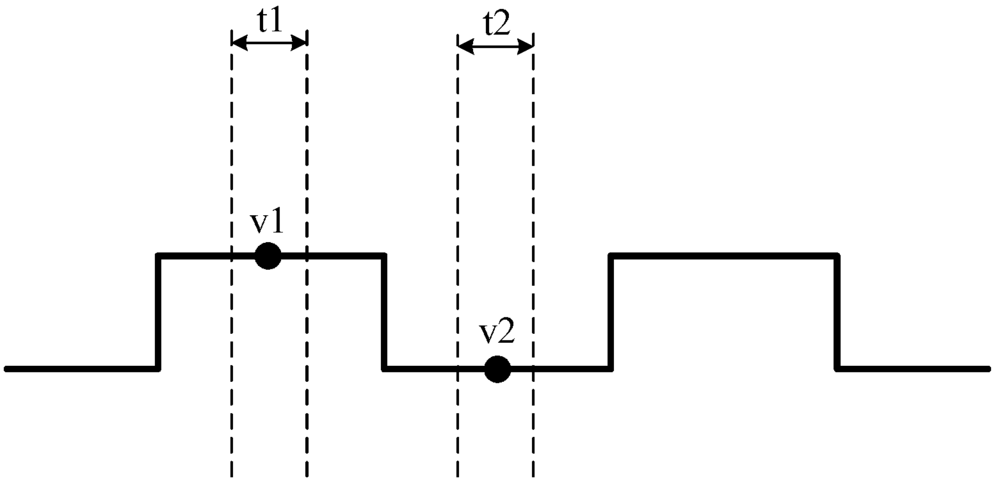
FIG. 4 illustrates a timing sequence diagram of a first periodic signal during a first bias compensation phase and a second bias compensation phase, consistent with the disclosed embodiments of the present disclosure.

FIG. 4 illustrates a timing sequence diagram of a first periodic signal during a first bias compensation phase and a second bias compensation phase, consistent with the disclosed embodiments of the present disclosure. Referring to FIGS. 2 and 4, in one embodiment, one light emitting period of the pixel circuit 20 may include at least one first bias compensation phase t1 and at least one second bias compensation phase t2. In the first bias compensation phase t1 and the second bias compensation phase t2, the bias compensation module 202 may be turned on. The first periodic signal of the target signal line V1 may be transmitted to the first terminal a of the driving module 201 or the second terminal b of the driving module 201 through the bias compensation module 202 to adjust the bias state of the threshold voltage of the driving module 201.

Polarities and/or amplitudes of the first periodic signal may be different in the first bias compensation phase t1 and the second bias compensation phase t2. For example, in the first bias compensation stage t1, the voltage value of the first periodic signal may be a first voltage value v1. The first periodic signal with the first voltage value v1 may be transmitted to the first terminal a of the driving module 201 or the second terminal b of the driving module through the bias compensation module 202 to adjust the bias state of the threshold voltage of the driving module 201. In the second bias compensation stage t2, the voltage value of the first periodic signal may be a second voltage value v2. The first periodic signal with the second voltage value v2 may be transmitted to the first terminal a of the driving module 201 or the second terminal b of the driving module 201 through the bias compensation module 202 to adjust the bias state of the threshold voltage of the driving module 201.

The first voltage value v1 and the second voltage value v2 may be different. That is, the amplitudes of the first voltage value v1 and the second voltage value v2 may be different. For example, the first voltage value v1 may be greater than the second voltage value v2, or the first voltage value v1 may be smaller than the second voltage value v2.

The polarities of the first voltage value v1 and the second voltage value v2 may be same or opposite. For example, the first voltage value v1 and the second voltage value v2 may each be greater than 0V. For example, the first voltage value v1 may be greater than 0V, and the second voltage value v2 may be less than 0V. For example, the first voltage value v1 may be less than 0V, and the second voltage value v2 may be greater than 0V. The present disclosure does not limit whether the polarities of the first voltage value v1 and the second voltage value v2 are same.

In this way, in different bias compensation stages, the threshold voltage of the driving module may be adjusted by using a combination of the voltage signals with different polarities and/or amplitudes in the first periodic signal. That is, voltage signals with different voltage values may be repeatedly applied to the first terminal of the driving module or the second terminal of the driving module. Accordingly, characteristics of the driving module may be recovered. In addition, the second terminal of the driving module may be adjusted to the desired potential. As such, dynamic adjustment of the potential of the second terminal of the driving module may be realized, and adjustment requirements of the threshold voltage of the driving module may thus be met.

Figure 5:
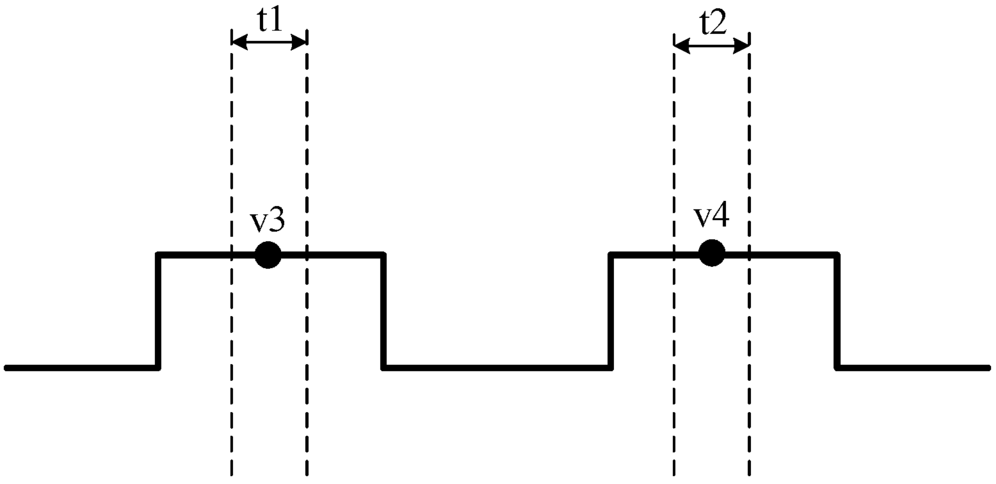
FIG. 5 illustrates another timing sequence diagram of a first periodic signal during a first bias compensation phase and a second bias compensation phase, consistent with the disclosed embodiments of the present disclosure.

FIG. 5 illustrates another timing sequence diagram of a first periodic signal during a first bias compensation phase and a second bias compensation phase, consistent with the disclosed embodiments of the present disclosure. Referring to FIGS. 2 and 5, in one embodiment, the polarities of the first periodic signal in the first bias compensation phase t1 and the second bias compensation phase t2 are same. For example, in the first bias compensation stage t1, the voltage value of the first periodic signal is a third voltage value v3. The first periodic signal with the third voltage value v3 is transmitted to the first terminal a of the driving module 201 or the second terminal b of the driving module 201 through the bias compensation module 202 to adjust the bias state of the threshold voltage of the driving module 201. For example, in the second bias compensation stage t2, the voltage value of the first periodic signal is a fourth voltage value v4. The first periodic signal with the fourth voltage value v4 is transmitted to the first terminal a of the driving module 201 or the second terminal b of the driving module 201 through the bias compensation module 202 to adjust the bias state of the threshold voltage of the driving module.

The polarity of the third voltage value v3 may be same as the polarity of the fourth voltage value v4. In one embodiment, the third voltage value v3 and the fourth voltage value v4 may each be greater than 0V. That is, the third voltage value v3 and the fourth voltage value v4 may each be positive voltage values. In some other embodiments, the third voltage value v3 and the fourth voltage value v4 may each be less than 0V. That is, the third voltage value v3 and the fourth voltage value v4 may each be negative voltage values.

It should be noted that the amplitudes of the third voltage value v3 and the fourth voltage value v4 may be same or different. When the magnitudes of the third voltage v3 and the fourth voltage v4 are different, the third voltage v3 may be greater than the fourth voltage v4, or the third voltage v3 may be smaller than the fourth voltage v4.

In this way, during a plurality of bias compensation phases in one lighting cycle, the threshold voltage of the driving module may be adjusted for a plurality of times by using voltage signals with a same polarity in the first periodic signal. Accordingly, the threshold voltage of the driving module may be adjusted to an expected state, and problems of low brightness and poor brightness uniformity of the first frame may be addressed.

Figure 6:
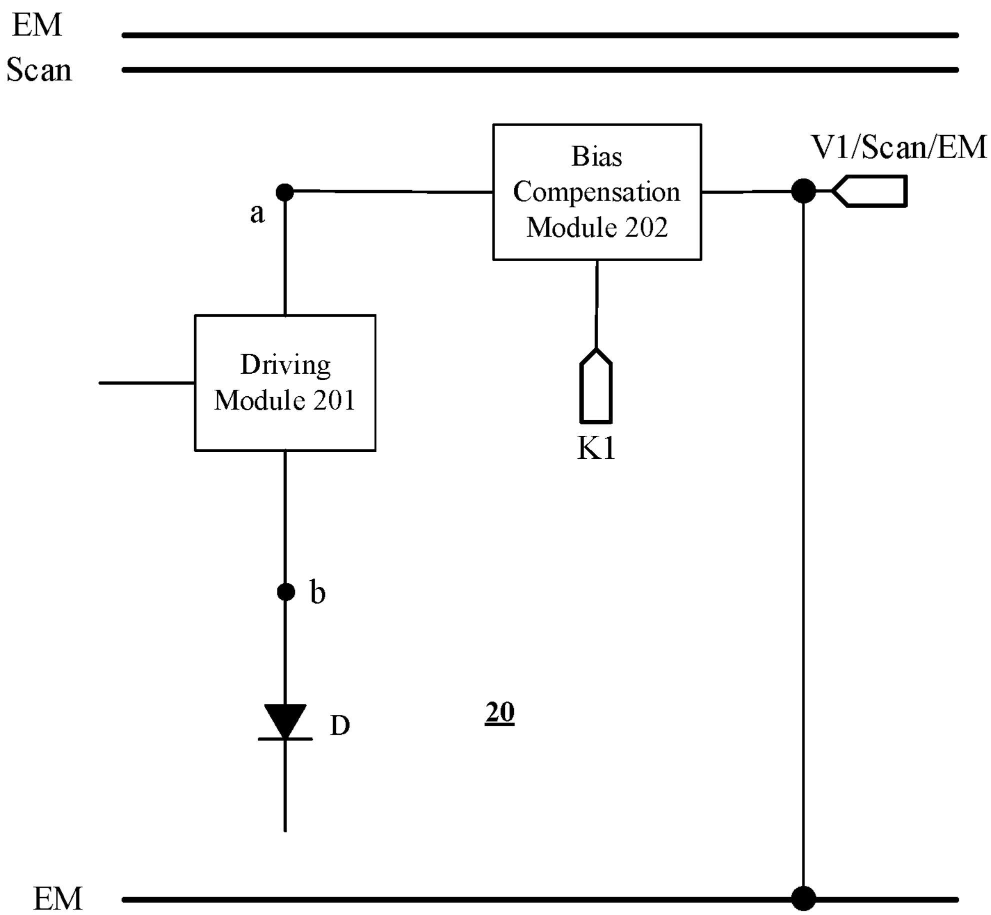
FIG. 6 illustrates another schematic circuit diagram of a pixel circuit consistent with the disclosed embodiments of the present disclosure.

FIG. 6 illustrates another schematic circuit diagram of a pixel circuit consistent with the disclosed embodiments of the present disclosure. As shown in FIG. 6, in one embodiment, a display panel where the pixel circuit 20 is located may include a light emitting control signal line EM and a scan control signal line Scan. The light emitting control signal line EM may be used to transmit light emitting control signals. The scan control signal line Scan may be used to transmit scan control signals. The target signal line V1 may multiplex the scan control signal line Scan, or the light emitting control signal line EM of a non-self pixel circuit.

Specifically, for example, one row of pixel circuits 20 may be correspondingly connected to one scan control signal line Scan and one light emitting control signal line EM. In one embodiment, for any i-th row of pixel circuits, where i is a positive integer, the target signal line V1 correspondingly connected to the i-th row of pixel circuits may multiplex the scan control signal line Scan correspondingly connected to the i-th row of pixel circuits. In some other embodiment, the target signal line V1 correspondingly connected to the i-th row of pixel circuits may multiplex the light emitting control signal line EM correspondingly connected to other rows of pixel circuits except the i-th row of pixel circuits.

The light emitting control signal and the scan control signal may each be a pulse signal, such as a periodic signal. By multiplexing the scan control signal line Scan or the light emitting control signal line EM of a non-self pixel circuit as the target signal line V1, the first periodic signal may be transmitted to the first terminal a of the driving module 201 or the second terminal b of the driving module 201 to adjust the bias state of the threshold voltage of the driving module 201. In addition, since the target signal line V1 multiplexes the scan control signal line Scan, or the light emitting control signal line EM of a non-self pixel circuit, a quantity of signal lines in the display panel may be reduced, wiring design may be simplified, and production costs may be reduced.

Figure 7:
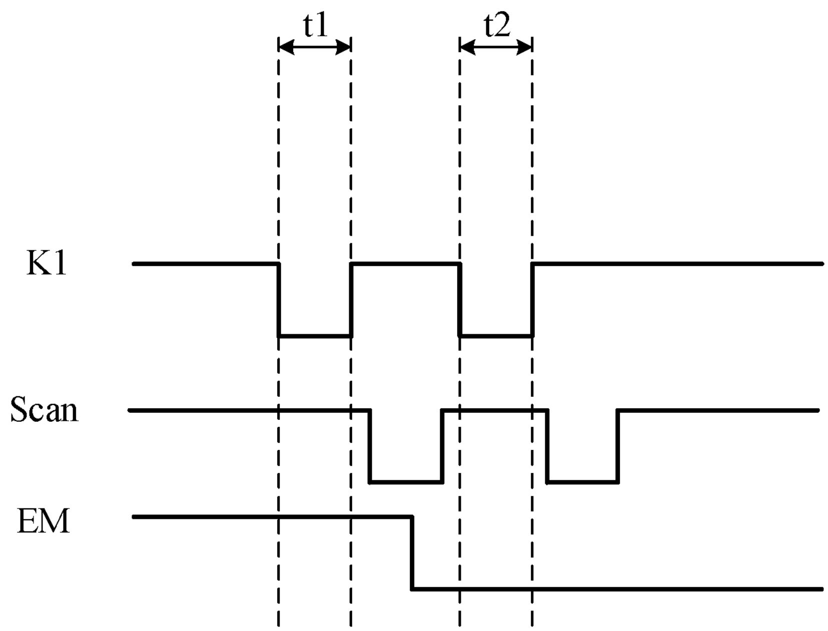
FIG. 7 illustrates a schematic diagram of a driving sequence corresponding to the pixel circuit shown in FIG. 6, consistent with the disclosed embodiments of the present disclosure.

FIG. 7 illustrates a schematic diagram of a driving sequence corresponding to the pixel circuit shown in FIG. 6. Referring to FIGS. 6 and 7, in one embodiment, in the first bias compensation phase t1, the bias compensation module 202 may be turned on under the control of the first control signal line K1. The light emitting control signal with a first potential of the light emitting control signal line EM or the scan signal with a first potential of the scan control signal line Scan may be transmitted to the first terminal a of the driving module 201 or the second terminal b of the driving module to adjust the bias state of the threshold voltage of the driving module 201. In one embodiment, as shown in FIG. 7, the first potential is a high potential. In some other embodiments, the first potential may be a low potential.

In the second bias compensation phase t2, the bias compensation module 202 may be turned on under the control of the first control signal line K1. In one embodiment, the light emitting control signal with the first potential or the second potential of the light emitting control signal line EM may be transmitted to the first terminal a of the driving module 201 or the second terminal b of the driving module 201 to adjust the bias state of the threshold voltage of the driving module 201. In some other embodiments, the scan signal of the first potential or the second potential of the scan control signal line Scan may be transmitted to the first terminal a of the driving module 201 or the second terminal b of the driving module 201 to adjust the bias state of the threshold voltage of the driving module 201.

It should be noted that, in FIG. 7, as an example for illustration purposes, the first potential is a high potential and the second potential is a low potential. In some other embodiments, the first potential may also be a low potential, and the second potential may be a high potential.

Figure 8:
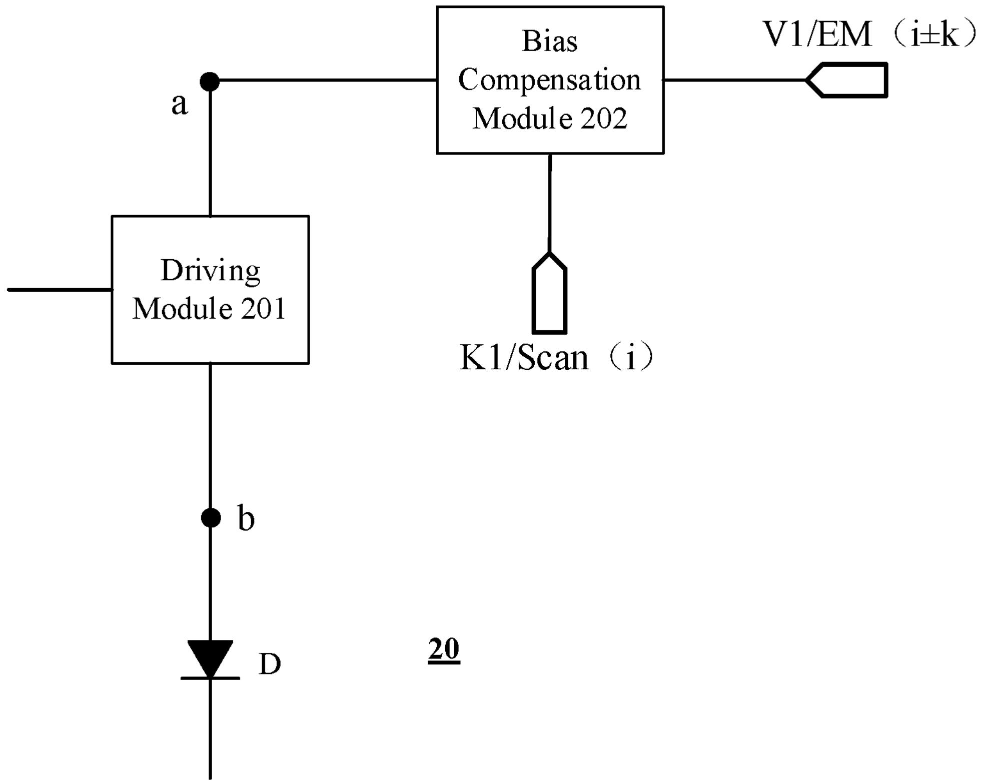
FIG. 8 illustrates another schematic circuit diagram of a pixel circuit consistent with the disclosed embodiments of the present disclosure.
Figure 9:
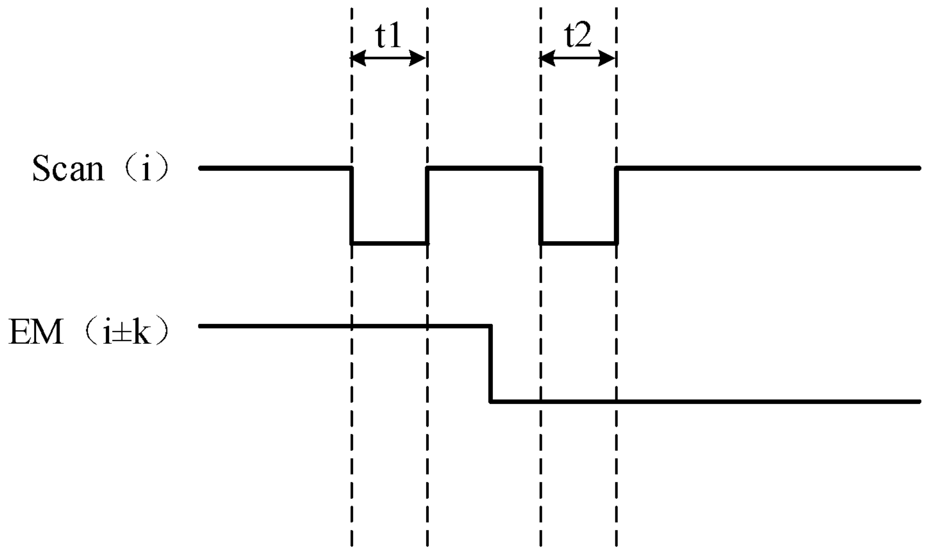
FIG. 9 illustrates a schematic diagram of a driving sequence corresponding to the pixel circuit shown in FIG. 8, consistent with the disclosed embodiments of the present disclosure.

FIG. 8 illustrates another schematic circuit diagram of a pixel circuit consistent with the disclosed embodiments of the present disclosure. As shown in FIG. 8, in one embodiment, the target signal line V1 may multiplex a light emitting control signal line EM of a non-self pixel circuit, and the first control signal line K1 may multiplex a scan control signal line Scan. FIG. 9 illustrates a schematic diagram of a driving sequence corresponding to the pixel circuit shown in FIG. 8. Referring to FIGS. 8 and 9, for any i-th row of pixel circuits, where i is a positive integer, the i-th row of pixel circuits may be correspondingly connected to the light emitting control signal line EM(i). The target signal line V1 correspondingly connected to the i-th row of pixel circuits may multiplex the light emitting control signal line EM(i±k) correspondingly connected to other rows of pixel circuits except the i-th row of pixel circuits. The first control signal line K1 correspondingly connected to the i-th row of pixel circuits may multiplex the scan control signal line Scan(i) correspondingly connected to the i-th row of pixel circuits.

In the first bias compensation stage t1, the bias compensation module 202 in the i-th row of pixel circuits may be turned on under the control of the scan control signal line Scan(i). The light emitting control signal with the first potential on the light emitting control signal line EM(i±k) may be transmitted to the first terminal a of the driving module 201 or the second terminal b of the driving module to adjust the bias state of the threshold voltage of the driving module 201. In the second bias compensation stage t2, the bias compensation module 202 in the i-th row of pixel circuits may be turned on under the control of the scan control signal line Scan(i). The light emitting control signal with the first potential or the second potential of the light emitting control signal line EM(i±k) may be transmitted to the first terminal a of the driving module 201 or the second terminal b of the driving module to adjust the bias state of the threshold voltage of the driving module 201.

Figure 10:
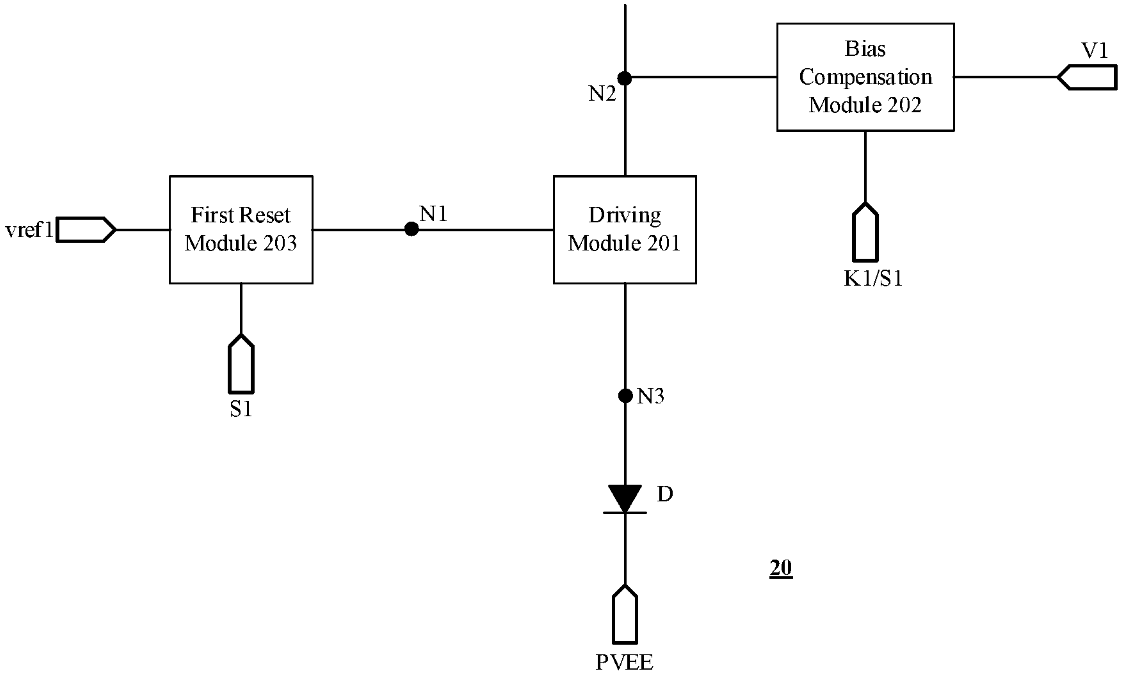
FIG. 10 illustrates another schematic circuit diagram of a pixel circuit consistent with the disclosed embodiments of the present disclosure.

FIG. 10 illustrates another schematic circuit diagram of a pixel circuit consistent with the disclosed embodiments of the present disclosure. As shown in FIG. 10, in one embodiment, the control terminal of the driving module 201 may be electrically connected to a first node N1, the first terminal of the driving module 201 may be electrically connected to a second node N2, and the second terminal of the driving module 201 may be electrically connected to a third node N3.

The pixel circuit 20 may also include a first reset module 203. A control terminal of the first reset module 203 is electrically connected to a first scan control signal line S1. A first terminal of the first reset module 203 is electrically connected to a first reference voltage signal line vref1. A second terminal of the first reset module 203 is electrically connected to the first node N1.

The first control signal line K1 may multiplex the first scan control signal line S1. That is, the first reset module 203 and the bias compensation module 202 may be turned on simultaneously under the control of the first scan control signal line S1. When the first reset module 203 is turned on, the first reference voltage signal of the first reference voltage signal line vref1 may be transmitted to the first node N1 through the first reset module 203 to reset the first node N1. When the bias compensation module 202 is turned on, the first periodic signal may be transmitted to the first terminal a of the driving module 201 or the second terminal b of the driving module through the bias compensation module 202 to adjust the bias state of the threshold voltage of the driving module 201.

Figure 11:
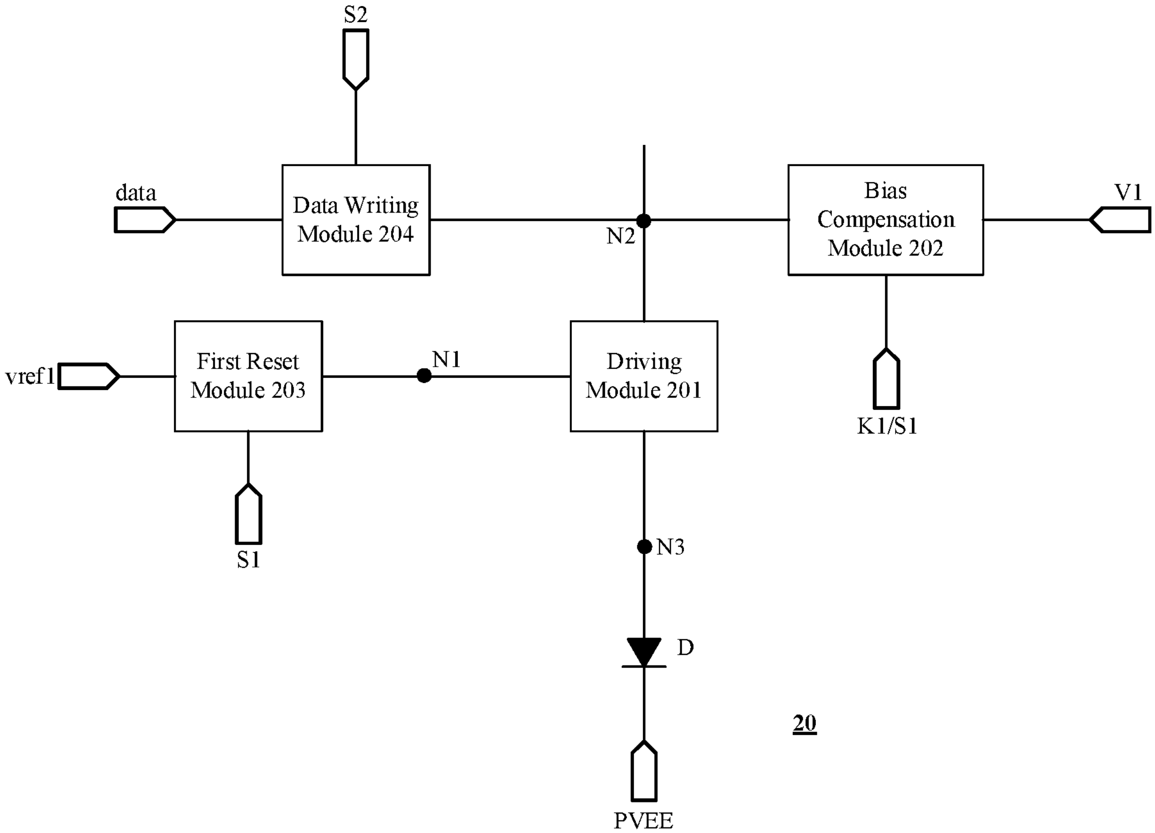
FIG. 11 illustrates another schematic circuit diagram of a pixel circuit consistent with the disclosed embodiments of the present disclosure.

FIG. 11 illustrates another schematic circuit diagram of a pixel circuit consistent with the disclosed embodiments of the present disclosure. As shown in FIG. 11, in one embodiment, the pixel circuit 20 may also include a data writing module 204. A control terminal of the data writing module 204 is electrically connected to a second scan control signal line S2. A first terminal of the data writing module 204 is electrically connected to a data signal line data. A second terminal of the data writing module 204 is electrically connected to the first terminal of the driving module 201.

Figure 12:
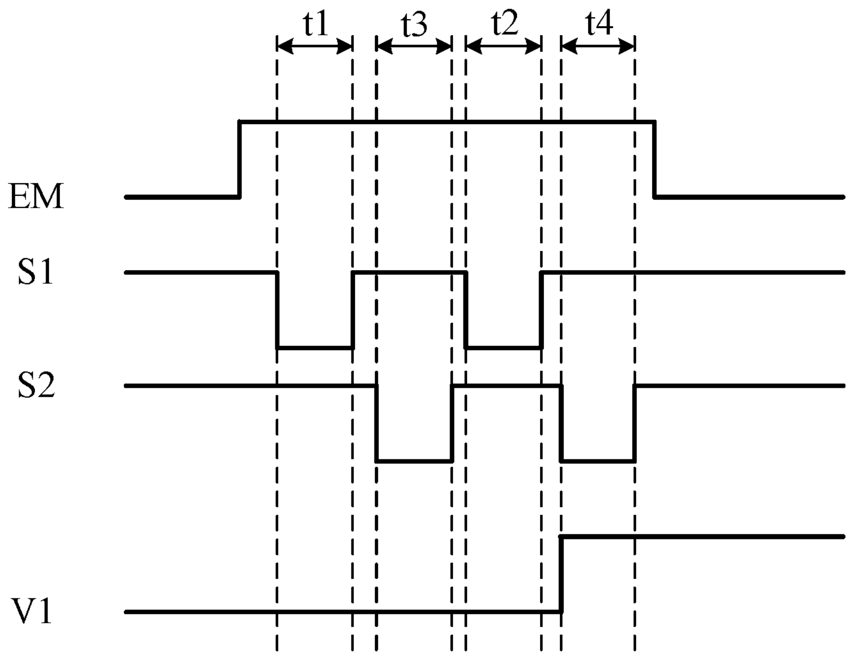
FIG. 12 illustrates a schematic diagram of a driving sequence corresponding to the pixel circuit shown in FIG. 11, consistent with the disclosed embodiments of the present disclosure.

FIG. 12 illustrates a schematic diagram of a driving sequence corresponding to the pixel circuit shown in FIG. 11. Referring to FIGS. 11 and 12, the light emitting period of the pixel circuit 20 may also include a first data writing phase t3 and a second data writing phase t4. In the first data writing phase t3 and the second data writing phase t4, the data writing module 204 is turned on under the control of the second scan control signal line S2. Data signals of the data signal line may be written into the first terminal of the driving module 201 to realize data-signal writing.

In a same light emitting period, the first data writing phase t3 may be located between the first bias compensation phase t1 and the second bias compensation phase t2. The second bias compensation phase t2 may be located between the first data writing phase t3 and the second data writing phase t4.

In the first bias compensation phase t1 and the second bias compensation phase t2, the first reset module 203 may be turned on under the control of the first scan control signal line S1. The first reference voltage signal may be transmitted to the first node N1 through the first reset module 203 to reset the first node N1. In the first bias compensation phase t1 and the second bias compensation phase t2, the bias compensation module 202 may be turned on under the control of the first scan control signal line S1. The first periodic signal may be transmitted to the first terminal a of the driving module 201 or the second terminal b of the driving module through the bias compensation module 202 to adjust the bias state of the threshold voltage of the driving module. In the first data writing phase t3 and the second data writing phase t4, the data writing module 204 may be turned on under the control of the second scan control signal line S2. Data signals of the data signal line may be written into the first terminal of the driving module 201 to realize data-signal writing.

In this way, in one light-emitting period, by alternately performing reset and data-signal writing to the first node N1, the potential of the first node N1 may reach an expected potential. In addition, in a light-emitting period, by alternately adjusting the bias state of the threshold voltage of the driving module and writing the data signals, the threshold voltage of the driving module may be adjusted to an expected state.

Figure 13:
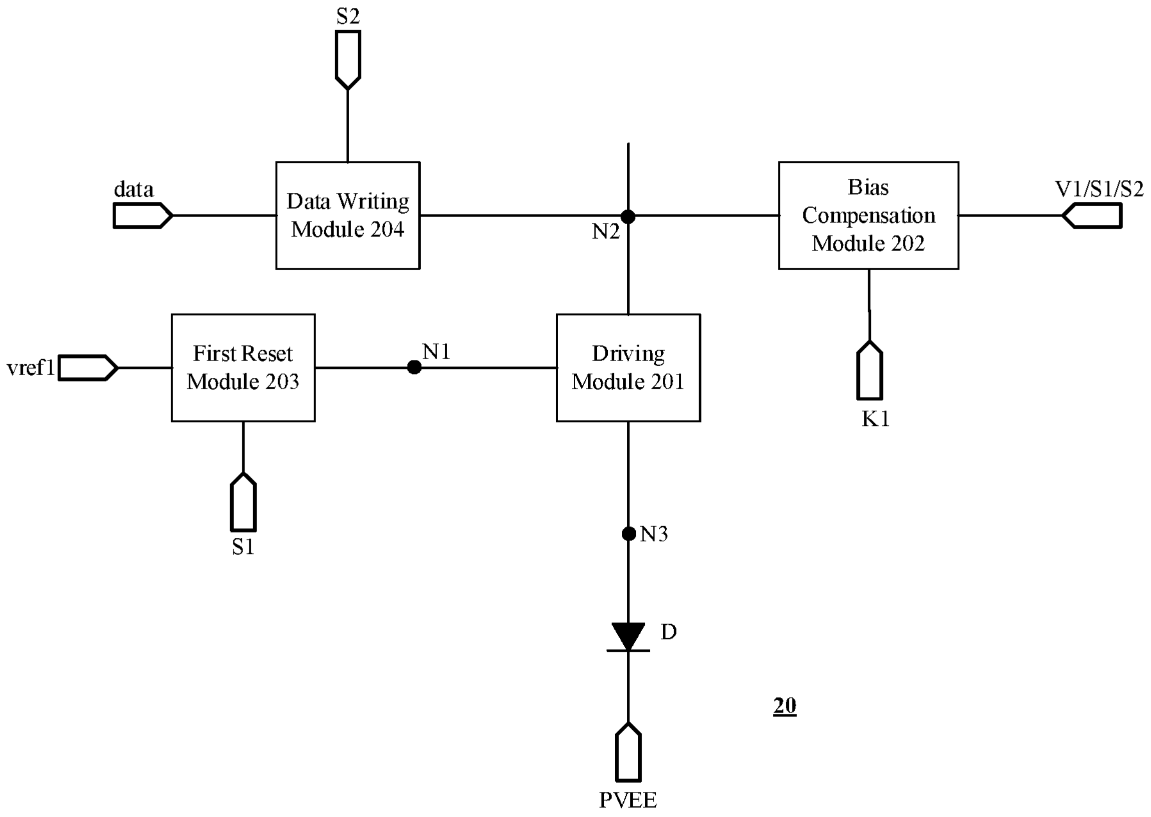
FIG. 13 illustrates another schematic circuit diagram of a pixel circuit consistent with the disclosed embodiments of the present disclosure.

FIG. 13 illustrates another schematic circuit diagram of a pixel circuit consistent with the disclosed embodiments of the present disclosure. As shown in FIG. 13, in one embodiment, the first control signal line K1 may not multiplex other signal lines, and the first control signal line K1 may be an additional signal line. The target signal line V1 may multiplex the first scan control signal line S1 or the second scan control signal line S2.

Figure 14:
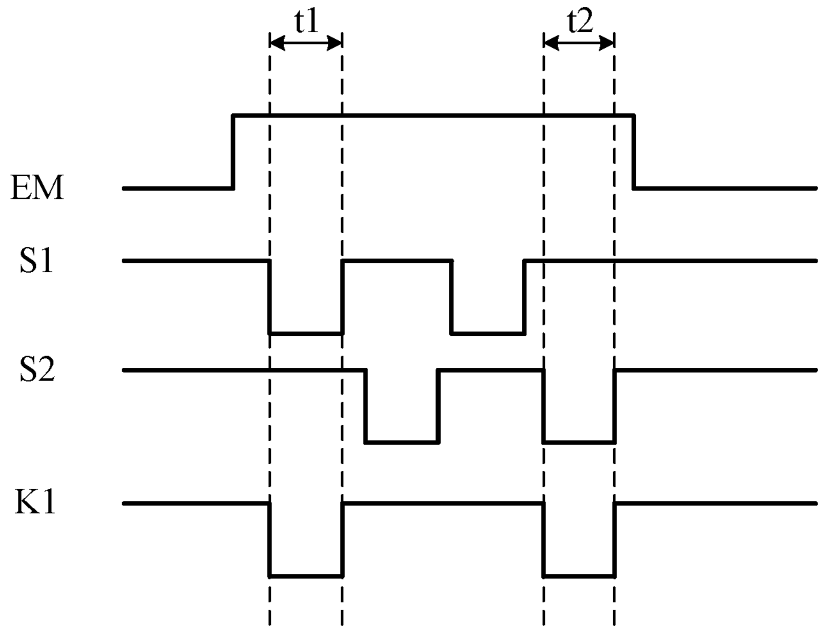
FIG. 14 illustrates a schematic diagram of a driving sequence corresponding to the pixel circuit shown in FIG. 13, consistent with the disclosed embodiments of the present disclosure.

FIG. 14 illustrates a schematic diagram of a driving sequence corresponding to the pixel circuit shown in FIG. 13. Referring to FIGS. 13 and 14, on the one hand, since the first control signal line K1 is an additional signal line, the control of the bias compensation module 202 may be flexible. That is, the time for adjusting the bias state of the threshold voltage of the driving module may not be affected and limited by the reset of the first node N1. Accordingly, the threshold voltage of the driving module may be adjusted to an expected state. On the other hand, the target signal line V1 may multiplex the first scan control signal line S1 or the second scan control signal line S2, and the quantity of signal lines may thus be reduced. Accordingly, output requirements on a driving chip may be decreased, and the wiring design of the display panel may be improved.

The inventors of the present disclosure further realize that when the target signal line V1 multiplexes the second scan control signal line S2, when the bias compensation module 202 and the data writing module 204 are turned on simultaneously, the second node N2 may simultaneously receive the second scan control signal provided by the second scan control signal line S2 and the data signal provided by the data signal line data. The second scan control signal may affect the writing process of the data signals. As such, the light emitting element may not achieve the expected brightness.

Still referring to FIGS. 13 and 14, in one embodiment, in at least one data writing phase, the bias compensation module 201 and the data writing module 204 may each be turned on. When the target signal line V1 multiplexes the second scan control signal line S2, the voltage value of the second scan control signal provided by the second scan control signal line S2 may be same as the voltage value of the data signal provided by the data signal line data.

In this way, the voltage value of the second scan control signal provided by the second scan control signal line S2 is same as the voltage value of the data signal provided by the data signal line data. Accordingly, even if the bias compensation module 202 and the data writing module 204 are turned on simultaneously, the second scan control signal may not affect the writing process of the data signals. The potential of the first node N1 may reach an expected potential, and the light emitting element may achieve expected brightness.

Figure 15:
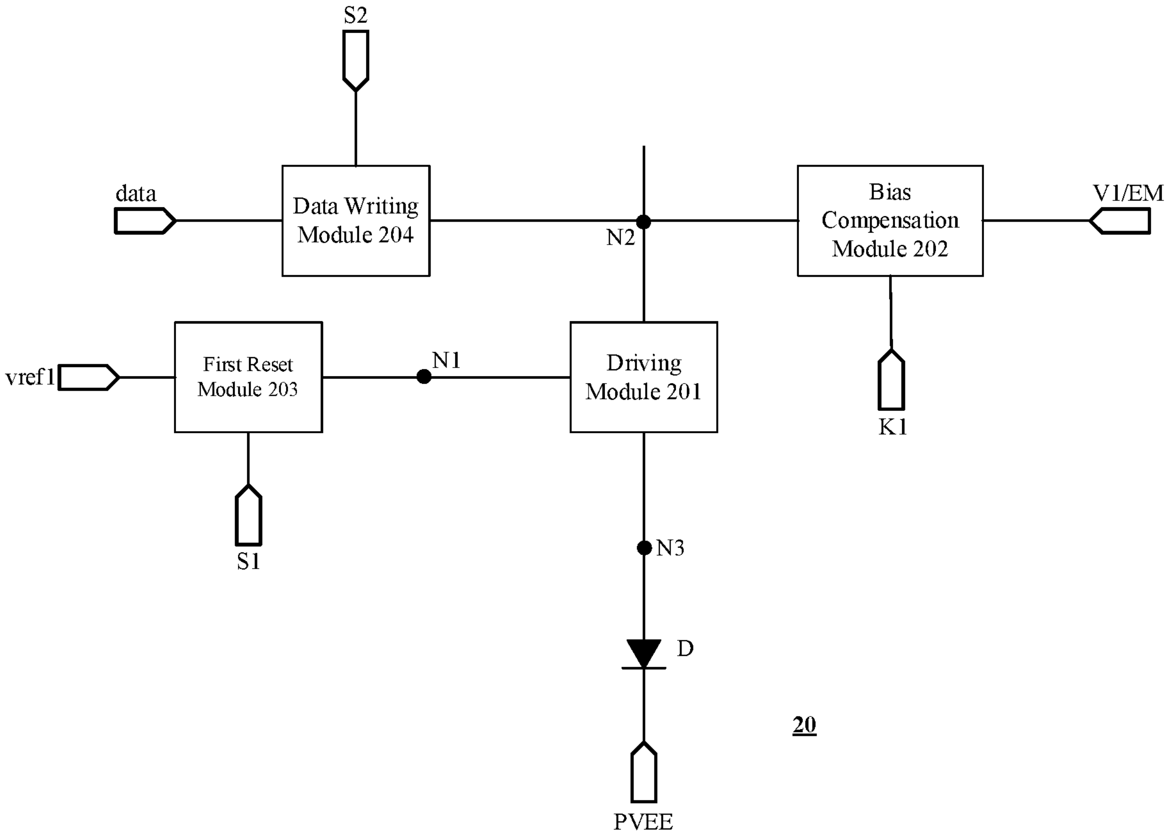
FIG. 15 illustrates another schematic circuit diagram of a pixel circuit consistent with the disclosed embodiments of the present disclosure.

FIG. 15 illustrates another schematic circuit diagram of a pixel circuit consistent with the disclosed embodiments of the present disclosure. As shown in FIG. 15, in one embodiment, the first control signal line K1 may not multiplex other signal lines, and the first control signal line K1 may be an additional signal line. The target signal line V1 may multiplex the light emitting control signal line EM of a non-self pixel circuit.

In this way, on the one hand, since the first control signal line K1 is an additional signal line, the control of the bias compensation module 202 may be flexible. That is, the time for adjusting the bias state of the threshold voltage of the driving module may not be affected and limited by the reset of the first node N1. Accordingly, the threshold voltage of the driving module may be adjusted to an expected state. On the other hand, the target signal line V1 may multiplex the light emitting control signal line EM of a non-self pixel circuit. Accordingly, the quantity of signal wires may be reduced, the output requirements on the driving chip may be decreased, and the wiring design of the display panel may be improved.

As described above, the target signal line V1 may multiplex the light emitting control signal line EM of a non-self pixel circuit. In one embodiment, a signal period of the light emitting control signal line EM may be same as a signal period of the first scan control signal line S1 and/or the second scan control signal line S2.

Figure 16:
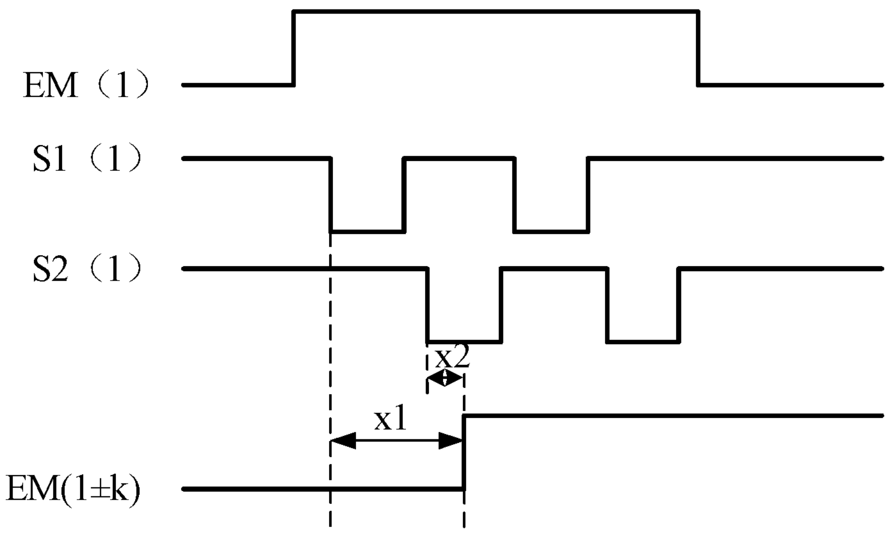
FIG. 16 illustrates a schematic diagram of a driving sequence of a pixel circuit consistent with the disclosed embodiments of the present disclosure.

FIG. 16 illustrates a schematic diagram of a driving sequence of a pixel circuit consistent with the disclosed embodiments of the present disclosure. As shown in FIG. 16, for example, the interval between the starting moment of the enable level of the first scan control signal line S1(1) correspondingly connected to the first row of pixel circuits 20 and the starting moment of the enable level of the target signal line V1 (such as the light emitting control signal line EM(1±k)) correspondingly connected to the first row of pixel circuits 20 is ×1. The interval between the starting moment of the enable level of the second scan control signal line S2(1) correspondingly connected to the first row of pixel circuits 20 and the starting moment of the enable level of the target signal line V1 (such as the light emitting control signal line EM(1±k)) correspondingly connected to the first row of pixel circuits 20 is ×2. Then, the interval between the starting moment of the enable level of the first scan control signal line S1(*n*) correspondingly connected to the n-th row of pixel circuits 20 and the starting moment of the enable level of the target signal line V1 (such as the light emitting control signal line EM(n±k)) correspondingly connected to the n-th row of pixel circuits 20 is also ×1. And/or the starting moment of the enable level of the second scan control signal line S2(*n*) correspondingly connected to the n-th row of pixel circuits 20 and the starting moment of the enable level of the target signal line V1 (such as the light emitting control signal line EM(n±k)) correspondingly connected to the n-th row of pixel circuits 20 is also ×2.

In this configuration, the signal period of the light emitting control signal line EM may be same as the signal period of the first scan control signal line S1 and/or the second scan control signal line S2. Accordingly, phase difference may be adjusted, and adjustment effects of the bias states of the threshold voltages of the driving modules of the pixel circuits in each row may be consistent.

Figure 17:
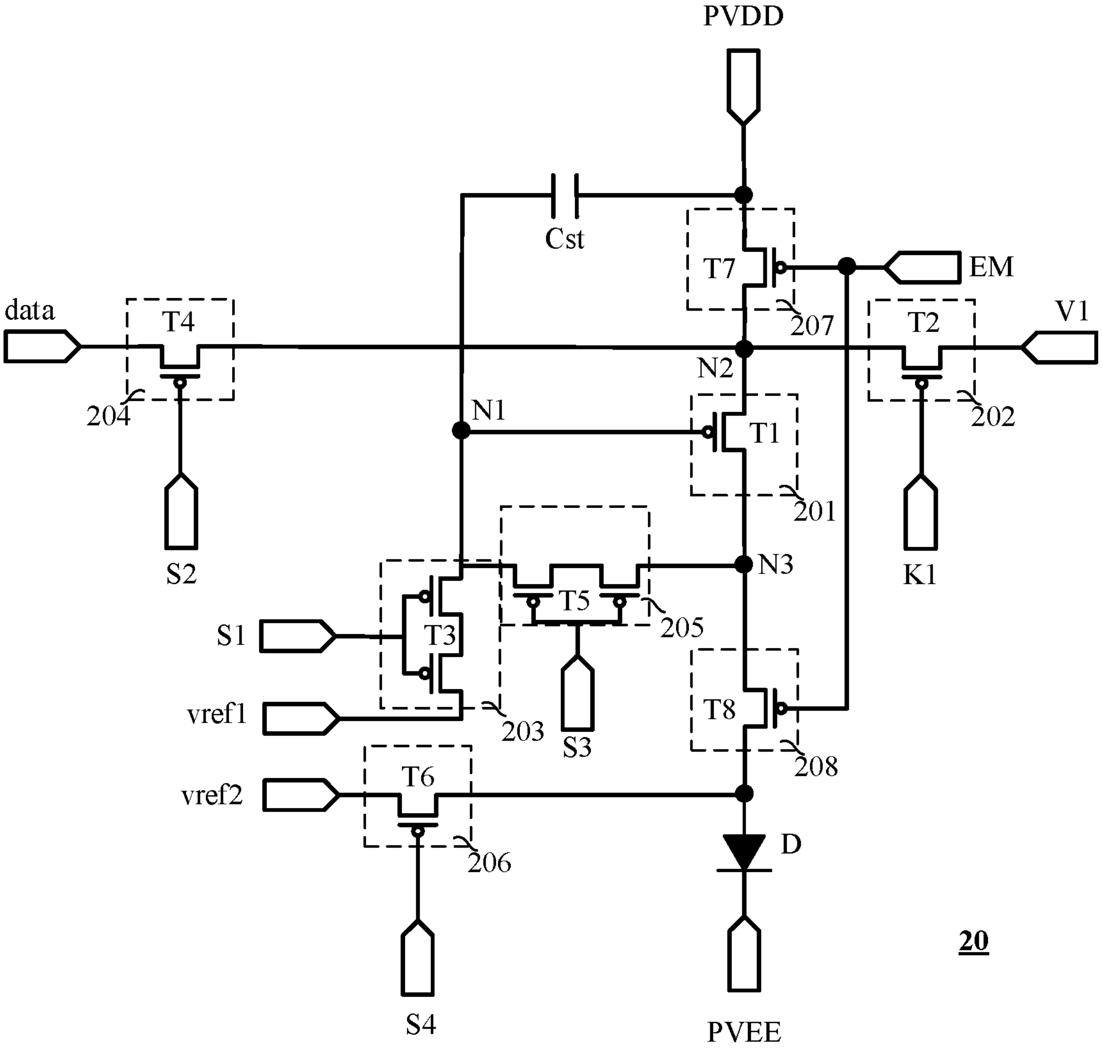
FIG. 17 illustrates another schematic circuit diagram of a pixel circuit consistent with the disclosed embodiments of the present disclosure.

FIG. 17 illustrates another schematic circuit diagram of a pixel circuit consistent with the disclosed embodiments of the present disclosure. As shown in FIG. 17, in one embodiment, the driving module 201 may include a first transistor T1. The bias compensation module 202 may include a second transistor T2. The first reset module 203 may include a third transistor T3. The data writing module 204 may include a fourth transistor T4. The pixel circuit 20 may also include a threshold compensation module 205, a second reset module 206, a first light emitting control module 207, a second light emitting control module 208, and a storage capacitor Cst. The threshold compensation module 205 may include a fifth transistor T5. The second reset module 206 may include a sixth transistor T6. The first light emitting control module 207 may include a seventh transistor T7. The second light emitting control module 208 may include an eighth transistor T8. In some embodiments, to reduce the leakage current at the first node N1, at least one of the third transistor T3 and the fifth transistor T5 may be a double-gate transistor.

A gate of the first transistor T1 is electrically connected to the first node N1. A first terminal of the first transistor T1 is electrically connected to the second node N2. A second terminal of the first transistor T1 is electrically connected to the third node N3.

A gate of the second transistor T2 is electrically connected to the first control signal line K1. A first terminal of the second transistor T2 is electrically connected to the target signal line V1. A second terminal of the second transistor T2 is electrically connected to the first terminal of the first transistor T1 or the second terminal of the first transistor T1.

A gate of the third transistor T3 is electrically connected to the first scan control signal line S1. A first terminal of the third transistor T3 is electrically connected to the first reference voltage signal line vref1. A second terminal of the third transistor T3 is electrically connected to the first node N1.

A gate of the fourth transistor T4 is electrically connected to the second scan control signal line S2. A first terminal of the fourth transistor T4 is electrically connected to the data signal line data. A second terminal of the fourth transistor T4 is electrically connected to the first terminal of the first transistor T1.

A gate of the fifth transistor T5 is electrically connected to the third scan control signal line S3. A first terminal of the fifth transistor T5 is electrically connected to the first node N1. A second terminal of the fifth transistor T5 is electrically connected to the third node N3.

A gate of the sixth transistor T6 is electrically connected to the fourth scan control signal line S4. A first terminal of the sixth transistor T6 is electrically connected to the second reference voltage signal line vref2. A second terminal of the sixth transistor T6 is electrically connected to the first terminal of the light-emitting element D.

A gate of the seventh transistor T7 is electrically connected to the light emitting control signal line EM. A first terminal of the seventh transistor T7 is electrically connected to the first power supply voltage signal line PVDD. A second terminal of the seventh transistor T7 is electrically connected to the second node N2.

A gate of the eighth transistor T8 is electrically connected to the light emitting control signal line EM. A first terminal of the eighth transistor T8 is electrically connected to the third node N3. A second terminal of the eighth transistor T8 is electrically connected to a first terminal of the light emitting element D.

A first electrode plate of the storage capacitor Cst is electrically connected to the first power voltage signal line PVDD. A second electrode plate of the storage capacitor Cst is electrically connected to the first node N1. A second terminal of the light emitting element D is electrically connected to the second power voltage signal line PVEE. The first terminal of the light emitting element D may be an anode of the light emitting element D. The second terminal of the light emitting element D may be a cathode of the light emitting element D.

As shown in FIG. 17, in some embodiments, the transistors (i.e., the first transistor T1 to the eighth transistor T8) in the pixel circuit 20 may be transistors with a same conductivity type, such as P-type transistors. In this case, the second scan control signal line S2, the third scan control signal line S3, and the fourth scan control signal line S4 may be multiplexed. Accordingly, the quantity of the signal lines may be reduced, and the wiring design may be simplified.

In addition, when the second transistor T2, the third transistor T3, the fourth transistor T4 and the fifth transistor T5 each are transistors of a same conductivity type, such as P-type transistors, the first control signal line K1 may be an additional signal line, and the first control signal line K1 may also multiplex the first scan control signal line S1 or the second scan control signal line S2. Correspondingly, the target signal line V1 may be an additional signal line, and the target signal line V1 may also multiplex the first scan control signal line S1, the second scan control signal line S2, or the light emitting control signal line EM of a non-self pixel circuit.

In one embodiment, the first reference voltage signal line vref1 and the second reference voltage signal line vref2 may provide reference voltage signals with a same voltage value. In some other embodiments, the first reference voltage signal line vref1 and the second reference voltage signal line vref2 may provide reference voltage signals of different voltage values. The present disclosure does not limit whether the reference voltage signals provided by the first reference voltage signal line vref1 and the second reference voltage signal line vref2 have a same voltage value.

Figure 18:
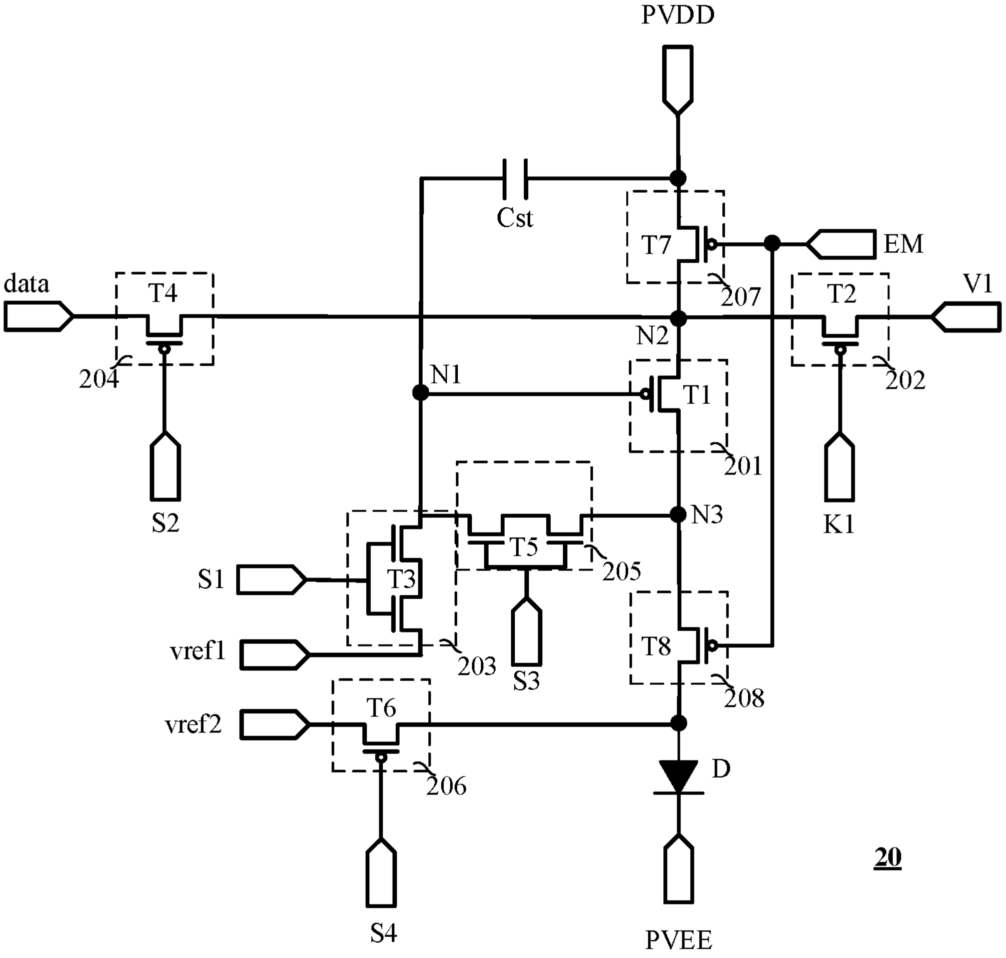
FIG. 18 illustrates another schematic circuit diagram of a pixel circuit consistent with the disclosed embodiments of the present disclosure.

FIG. 18 illustrates another schematic circuit diagram of a pixel circuit consistent with the disclosed embodiments of the present disclosure. As shown in FIG. 18, in one embodiment, the first reset module 203 and the threshold compensation module 205 may specifically be N-type transistors. That is, the third transistor T3 and the fifth transistor T5 may be N-type transistors. Accordingly, leakage current of the first node N1 may be reduced, and operation stability of the light-emitting element may be improved.

Figure 19:
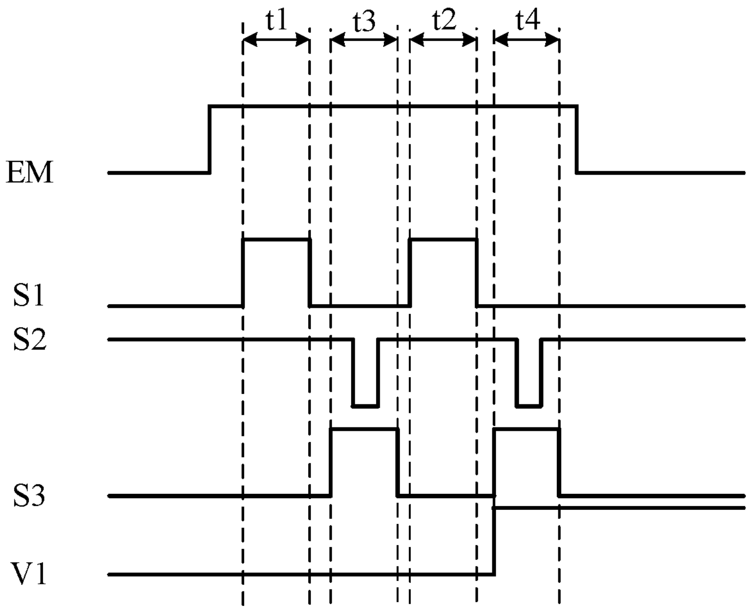
FIG. 19 illustrates a schematic diagram of a driving sequence corresponding to the pixel circuit shown in FIG. 18, consistent with the disclosed embodiments of the present disclosure.

FIG. 19 illustrates a schematic diagram of a driving sequence corresponding to the pixel circuit shown in FIG. 18. Referring to FIGS. 18 and 19, in one embodiment, the third transistor T3 and the fifth transistor T5 are N-type transistors, and the fourth transistor T4 and the sixth transistor T6 are P-type transistors. In addition, the first transistor T1, the seventh transistor T7 and the eighth transistor T8 may be P-type transistors. The second transistor T2 may be an N-type transistor, or a P-type transistor. The first scan control signal line S1, the second scan control signal line S2, and the third scan control signal line S3 may be different scan control signal lines. The fourth scan control signal line S4 may multiplex the second scan control signal line S2.

In one embodiment, the bias compensation module 202 may also be an N-type transistor, that is, the second transistor T2 may be an N-type transistor. Correspondingly, the first control signal line K1 may be an additional signal line, and the first control signal line K1 may also multiplex the first scan control signal line S1 or the third scan control signal line S3. Correspondingly, the target signal line V1 may be an additional signal line, and the target signal line V1 may also multiplex the first scan control signal line S1, the second scan control signal line S2, the third scan control signal line S3, or the light emitting control signal line EM of a non-self pixel circuit.

In one embodiment, the bias compensation module 202 may be a P-type transistor, that is, the second transistor T2 may be a P-type transistor. Correspondingly, the first control signal line K1 may be an additional signal line, and the first control signal line K1 may also multiplex the second scan control signal line S2. Correspondingly, the target signal line V1 may be an additional signal line, and the target signal line V1 may also multiplex the first scan control signal line S1, the second scan control signal line S2, the third scan control signal line S3, or the light emitting control signal line EM of a non-self pixel circuit.

As shown in FIG. 19, in one embodiment, the second transistor T2, the third transistor T3, and the fifth transistor T5 are N-type transistors, and other transistors are P-type transistors. The first control signal line K1 may multiplex the first scan control signal line S1. The first scan control signal line S1 may provide a high potential during the first bias compensation phase t1 and the second bias compensation phase t2. The first reset module 203 (that is, the third transistor T3) may be turned on under the control of the first scan control signal line S1. The first reference voltage signal may be transmitted to the first node N1 through the first reset module 203 to reset the first node N1. In the first bias compensation phase t1 and the second bias compensation phase t2, the bias compensation module 202 (that is, the second transistor T2) may be turned on under the control of the first scan control signal line S1. The first periodic signal may be transmitted to the first terminal of the first transistor T1 or the second terminal of the first transistor T1 through the second transistor T2 to adjust the bias state of the threshold voltage of the first transistor T1. In the first data writing phase t3 and the second data writing phase t4, the second scan control signal line S2 may provide a low potential, and the third scan control signal line S3 may provide a high potential. The data writing module 204 (that is, the fourth transistor T4) may be turned on under the control of the second scan control signal line S2. The threshold compensation module 205 (that is, the fifth transistor T5) may be turned on under the control of the third scan control signal line S3, and data signal writing and threshold voltage compensation of the first transistor T1 may thus be realized.

In this way, in one light-emitting period, by alternately performing reset and writing data signals to the first node N1, the potential of the first node N1 may reach an expected value. In addition, in one light-emitting period, by alternately adjusting the bias state of the threshold voltage of the first transistor T1 and writing data signals, the threshold voltage of the first transistor T1 may be adjusted to an expected state.

It should be noted that when the first control signal line K1 multiplexes the third scan control signal line S3, the bias compensation module 202 (that is, the second transistor T2) may be turned on in the first data writing phase t3 and the second data writing phase t4. The first periodic signal may be transmitted to the first terminal of the first transistor T1 or the second terminal of the first transistor T1 through the second transistor T2 to adjust the bias state of the threshold voltage of the first transistor T1.

When the first control signal line K1 does not multiplex either the first scan control signal line S1 or the third scan control signal line S3, the bias compensation module 202 (that is, the second transistor T2) may also be turned on in other stages, to adjust the bias state of the threshold voltage of the first transistor T1.

Figure 20:
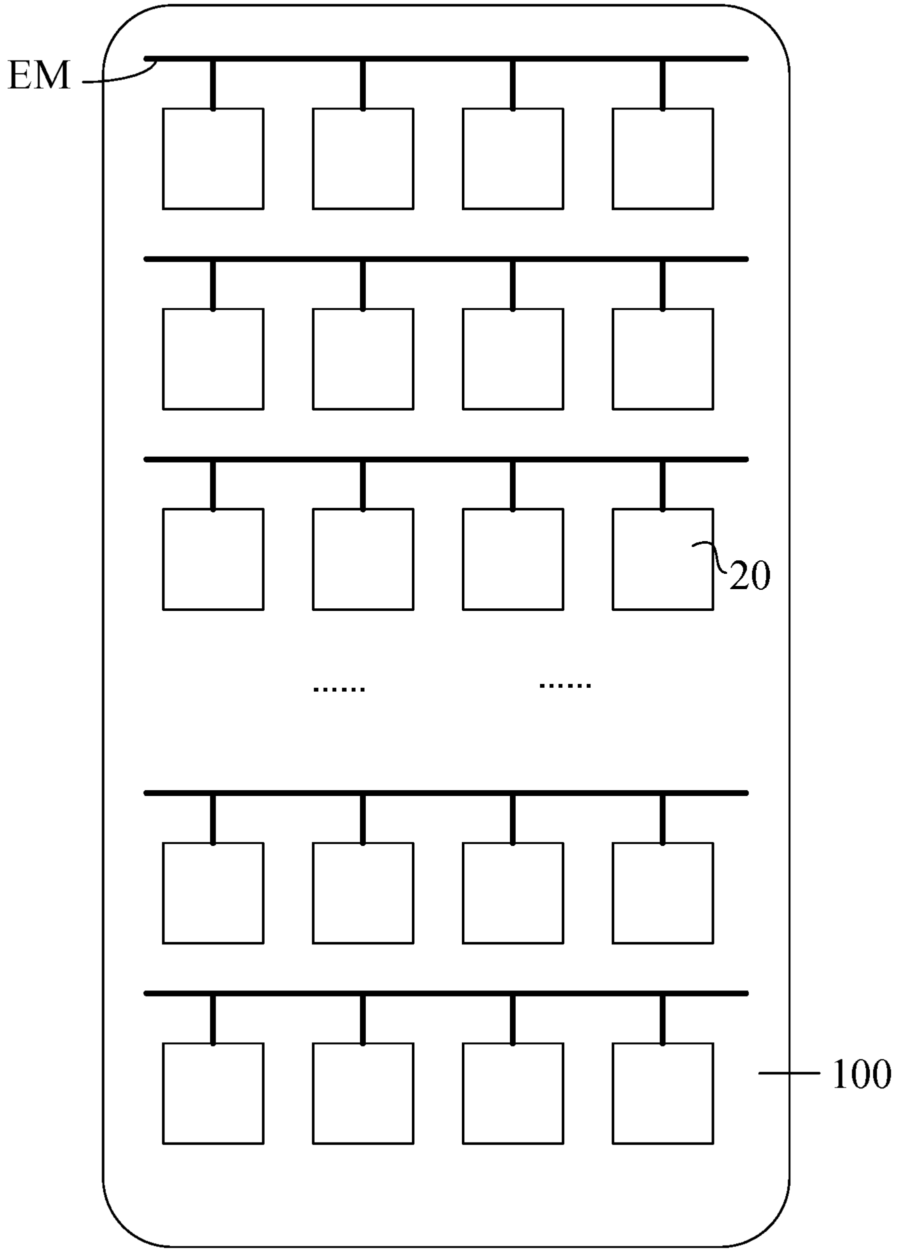
FIG. 20 illustrates a schematic structural diagram of a display panel consistent with the disclosed embodiments of the present disclosure.

The present disclosure also provides a display panel. FIG. 20 illustrates a schematic structural diagram of a display panel consistent with the disclosed embodiments of the present disclosure. As shown in FIG. 20, the display panel 100 provided by the present disclosure may include a plurality of rows of pixel circuits. Each row of pixel circuits may include pixel circuits 20 provided by the present disclosure.

For the display panel 100 provided by the present disclosure, on the one hand, the bias compensation module may transmit the first periodic signal of the target signal line to the first terminal of the driving module or the second terminal of the driving module. The potential difference between the second terminal of the drive module and the control terminal may be improved, the ion polarization level inside the drive module may be weakened, the threshold voltage of the driving module may be reduced, and the bias state of the threshold voltage of the driving module may be adjusted. On the other hand, the target signal line may provide the first periodic signal. When adjusting the threshold voltage of the driving module, a voltage signal of any voltage value in the first periodic signal or a combination of a plurality of voltage signals with different voltage values may be selected to adjust the threshold voltage of the driving module. Accordingly, adjustment requirements of the threshold voltage of the driving module in different situations may be met.

Figure 21:
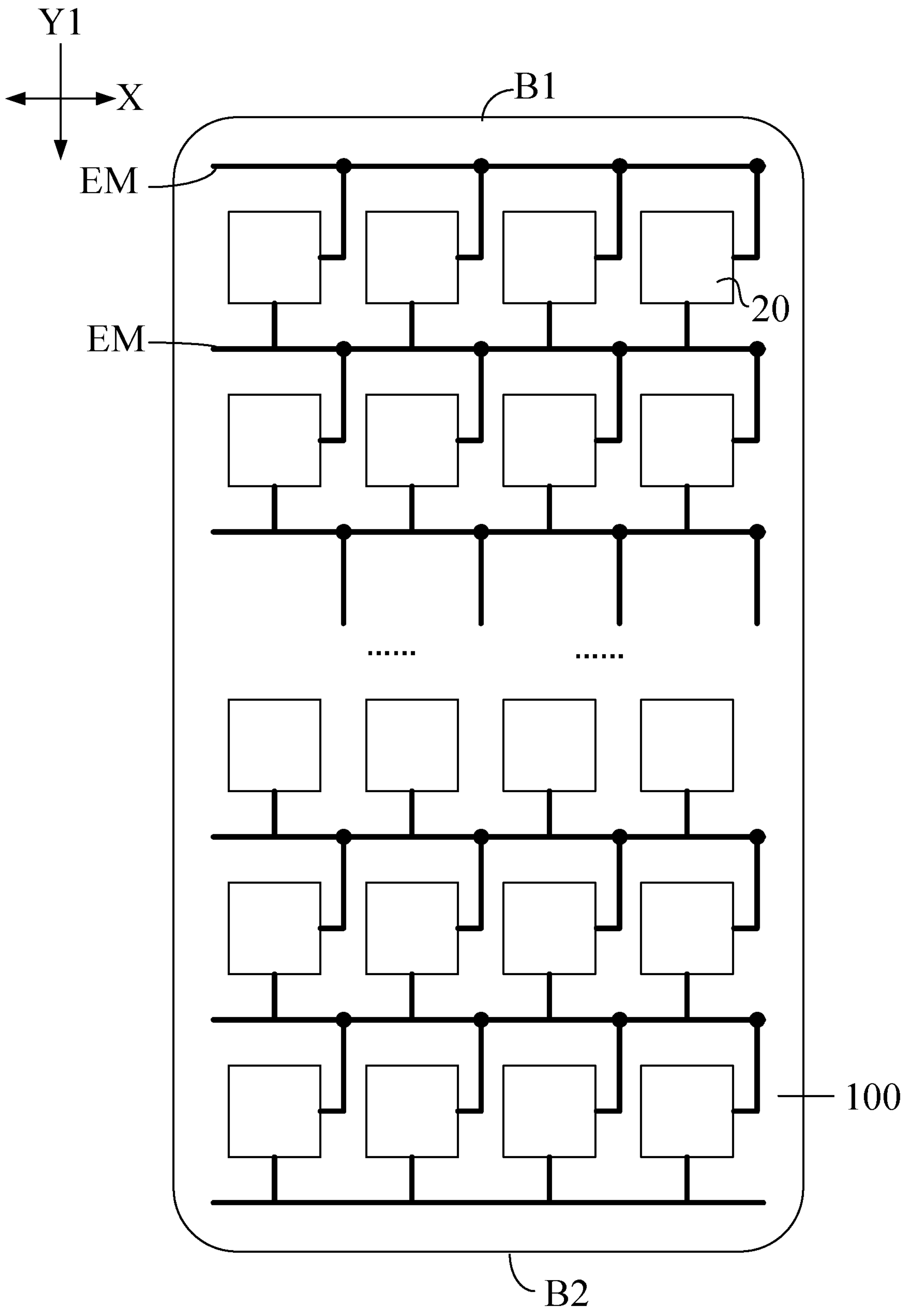
FIG. 21 illustrates another schematic structural diagram of a display panel consistent with the disclosed embodiments of the present disclosure.

FIG. 21 illustrates another schematic structural diagram of a display panel consistent with the disclosed embodiments of the present disclosure. As shown in FIG. 21, in one embodiment, the display panel 100 may include M rows of pixel circuits 20 and N light emitting control signal lines EM, where N and M are positive integers, with N≥M. One light emitting control signal line EM corresponds to one row of pixel circuits 20. The light emitting control signal line EM may be electrically connected to the light emitting control module in the pixel circuit 20. As shown in FIG. 17, the light emitting control module may be the first light emitting control module 207 and the second light emitting control module 208. Optionally, one light emitting control signal line EM may be electrically connected to the first light emitting control module 207 and the second light emitting control module 208 simultaneously.

Referring to FIGS. 17 and 21, for an i-th row of pixel circuits 20 in the M rows of pixel circuits 20, the target signal line V1 connected to the bias compensation module 202 in the i-th row of pixel circuits 20 may multiplex the light emitting control signal line EM correspondingly connected to a j-th row of pixel circuits 20, where i and j are positive integers, with i≠j, 1≤i≤M, and 1≤j≤M. The j-th row of pixel circuits 20 and the i-th row of the pixel circuit 20 are the pixel circuits in different rows. The j-th row of pixel circuits 20 may be located before the i-th row of pixel circuits 20 or after the i-th row of pixel circuits 20. That is, the target signal line V1 may multiplex the light emitting control signal line EM of a non-self pixel circuit.

Referring to FIG. 16, from a view of the driving sequence, when the target signal line V1 multiplexes the light emitting control signal line EM of a non-self pixel circuit, the positive voltage in the lighting control signal may be selected to adjust the bias state of the threshold voltage of the driving module. The negative voltage in the lighting control signal may also be selected to adjust the bias state of the threshold voltage of the driving module. In addition, a combination of the positive voltage and the negative voltage in the lighting control signal may also be selected to adjust the bias state of the threshold voltage of the driving module. Accordingly, adjustment requirements of the threshold voltage of the driving module in different situations may be met.

In one embodiment, the j-th row of pixel circuits and the i-th row of pixel circuits may be separated by k rows of pixel circuits, where k is a positive integer. That is, for the i-th row of pixel circuits, the target signal line V1 connected to the bias compensation module 202 in the i-th row of pixel circuits may multiplex the light emitting control signal line EM(i±k). The light emitting control signal line EM(i±k) is the light emitting control signal line EM connected to the light emitting control module in the j-th row of pixel circuits 20.

Still referring to FIG. 21, in one embodiment, k may be equal to 1. That is, the bias compensation module 202 in the i-th row of pixel circuits may be electrically connected to the light emitting control signal line EM corresponding to the pixel circuits in a previous row or a next row.

Figure 22:
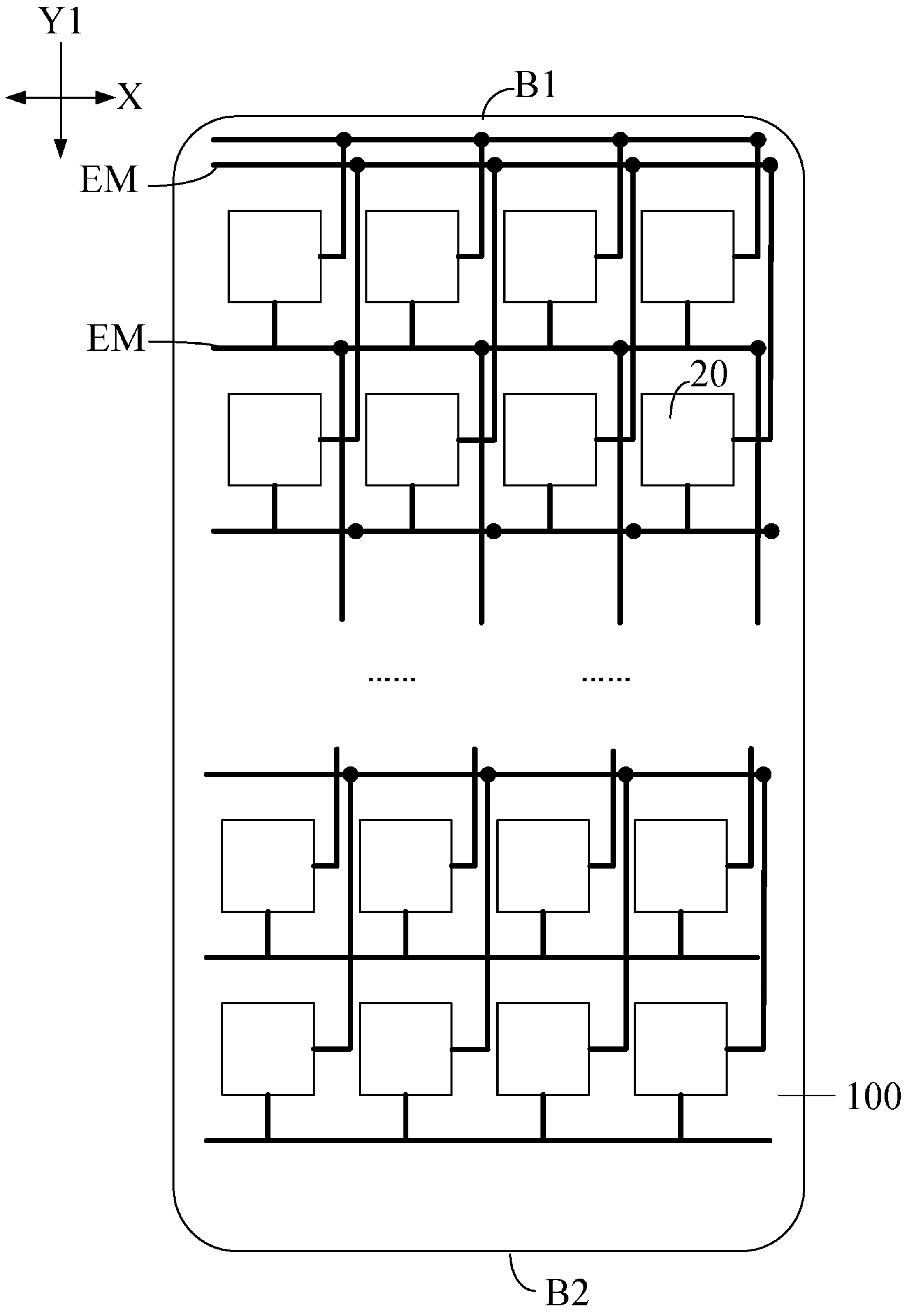
FIG. 22 illustrates another schematic structural diagram of a display panel consistent with the disclosed embodiments of the present disclosure.

In one embodiment, k may also be greater than 1. FIG. 22 illustrates another schematic structural diagram of a display panel consistent with the disclosed embodiments of the present disclosure. FIG. 22 shows a configuration with k equal to 2. In some other configurations, k may be greater than 2. The bias compensation module 202 in the i-th row of pixel circuits may be electrically connected to the light emitting control signal line EM corresponding to an upper k-th row or a lower k-th row of pixel circuits.

In one embodiment, the display panel 100 may include a first edge B1 and a second edge B2. In the configuration shown in FIG. 21, the first edge B1 of the display panel may be an upper edge of the display panel, and the second edge B2 of the display panel may be a lower edge of the display panel. As shown in FIG. 21, along a first direction Y1 pointing from the first edge B1 to the second edge B2 of the display panel, the first row of pixel circuits 20 to the M-th row of pixel circuits 20 are arranged in sequence. The j-th row of pixel circuits 20 may be located on a side of the i-th row of pixel circuits 20 close to the first edge B1. That is, in one embodiment, the bias compensation module 202 in the i-th row of pixel circuits may be electrically connected to the light emitting control signal line EM(i−k) corresponding to an upper k-th row of pixel circuits.

In this way, the target signal line V1 multiplexes the light emitting control signal line EM(i−k) corresponding to the upper k-th row of pixel circuits. Accordingly, the quantity of signal lines in the display panel may be reduced, wiring design may be simplified, and production costs may be reduced.

Figure 23:
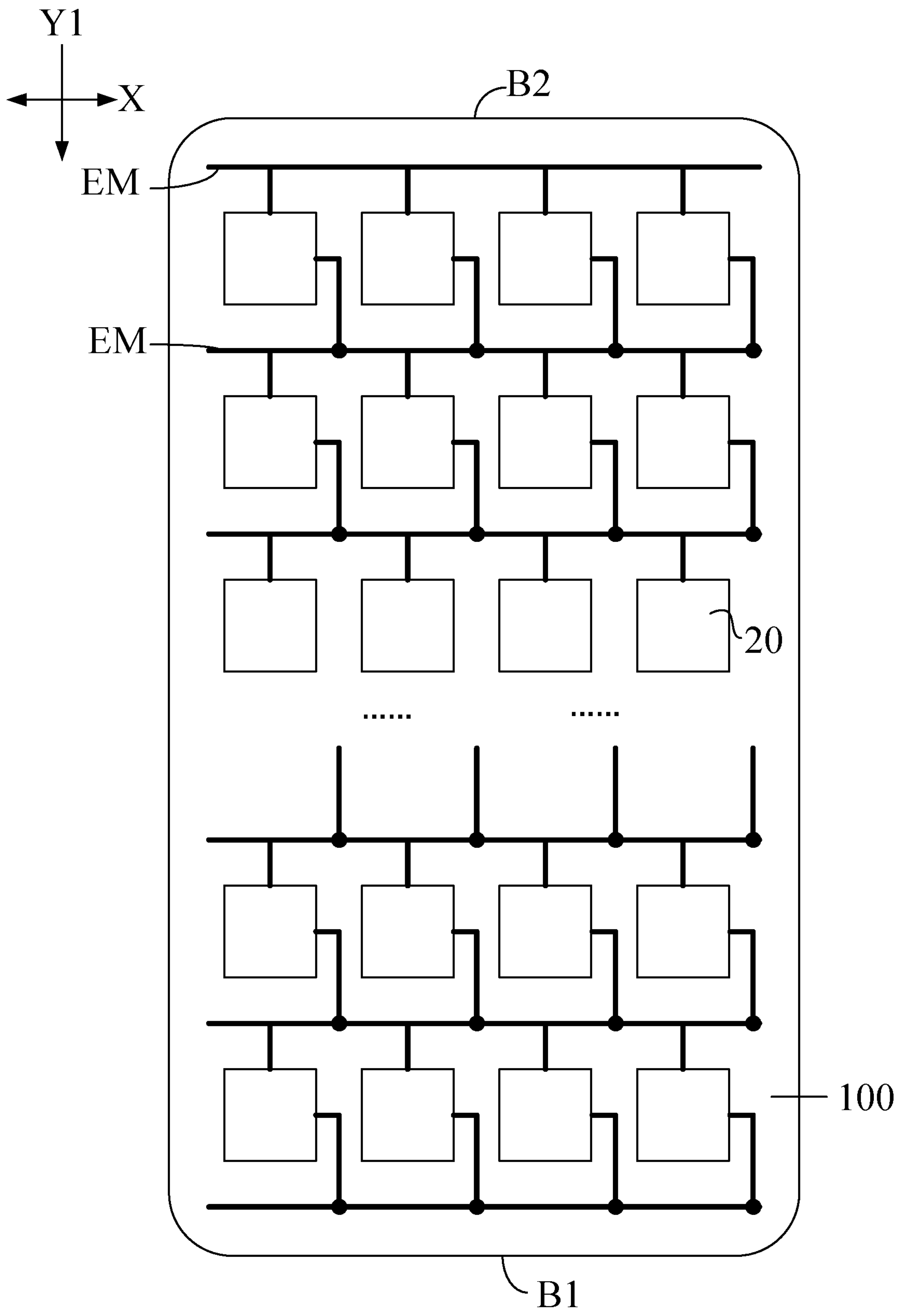
FIG. 23 illustrates another schematic structural diagram of a display panel consistent with the disclosed embodiments of the present disclosure.

FIG. 23 illustrates another schematic structural diagram of a display panel consistent with the disclosed embodiments of the present disclosure. As shown in FIG. 23, in one embodiment, the first edge B1 of the display panel may be the lower edge of the display panel, and the second edge B2 of the display panel may be the upper edge of the display panel. The j-th row of pixel circuits 20 may be located on a side of the i-th row of pixel circuits 20 close to the lower edge of the display panel. That is, in one embodiment, the bias compensation module 202 in the i-th row of pixel circuits may be electrically connected to a light emitting control signal line EM(i+k) corresponding to a lower k-th row of pixel circuits.

In this way, the target signal line V1 multiplexes the light emitting control signal line EM(i+k) corresponding to the pixel circuits in the lower k-th row. Accordingly, the quantity of signal lines in the display panel may be reduced, the wiring design may be simplified, and the production costs may be reduced.

The inventors of the present disclosure further realize that, when the target signal line V1 multiplexes the light emitting control signal line EM (i+k) corresponding to the pixel circuits in the lower k-th row, the pixel circuits in the last k rows may need k additional light emitting control signal lines EM, to provide the first periodic signal required by the bias compensation module 202 for the last k rows of pixel circuits. Similarly, when the target signal line V1 multiplexes the light emitting control signal line EM(i−k) corresponding to the upper k-th row of pixel circuits, the first k rows of pixel circuits may need k additional light emitting control signal lines EM, to provide the first periodic signal required by the bias compensation module 202 for the first k rows of pixel circuits.

Still referring to FIG. 21, specifically, in one embodiment, N≥M+k. That is, the quantity of light emitting control signal lines EM is greater than the quantity of rows of pixel circuits. The light emitting control signal line EM may extend along a second direction X. Along the first direction Y1 pointing from the first edge B1 to the second edge B2 of the display panel, the first light emitting control signal line EM to the N-th light emitting control signal line EM are sequentially arranged. The first direction Y1 intersects the second direction X.

At least k light emitting control signal lines EM near the first edge B1 of the display panel may not be electrically connected to the light emitting control modules in the pixel circuit 20 (such as the first light emitting control module 207 and the second light emitting control module 208 shown in FIG. 17). The at least k light emitting control signal lines EM may be additional light emitting control signal lines EM that are separately added.

Each row of pixel circuits in the (k+1)-th row of pixel circuits 20 to the M-th row of pixel circuits 20 may be electrically connected to the light emitting control signal line EM(i−k) corresponding to an upper k-th row of pixel circuits. The first row of pixel circuits 20 to the k-th row of pixel circuits 20 are electrically connected to the k light emitting control signal lines EM near the first edge B1 of the display panel respectively. One row of pixel circuits 20 is electrically connected to one light emitting control signal line EM.

In one embodiment, the first light emitting control signal line EM to the k-th light emitting control signal line EM close to the first edge B1 of the display panel are sequentially arranged along the first direction Y1. The bias compensation module in the first row of pixel circuits 20 may be electrically connected to the first light emitting control signal line EM. The bias compensation module in the second row of pixel circuits 20 may be electrically connected to the second light emitting control signal line EM . . . . The bias compensation module in the k-th row of pixel circuits 20 may be electrically connected to the k-th light emitting control signal line EM.

In this way, the first periodic signal required by the bias compensation module may be provided to the first k rows of pixel circuits through the at least k additional light-emitting control signal lines EM. Accordingly, the bias state of the threshold voltage of the driving module in the first k rows of pixel circuits may be adjusted, and the display uniformity of the display panel may thus be improved.

Still referring to FIG. 23, in one embodiment, the first edge B1 of the display panel may be the lower edge of the display panel, and the second edge B2 of the display panel may be the upper edge of the display panel. At least k light emitting control signal lines EM near the lower edge of the display panel are not electrically connected to the light emitting control modules in the pixel circuit 20 (such as the first light emitting control module 207 and the second light emitting control module 208 shown in FIG. 17). The at least k light emitting control signal lines EM may be additional light emitting control signal lines EM that are separately added.

An i-th row of pixel circuits in the first row of pixel circuits 20 to the (M−k)-th row of pixel circuits 20 may be electrically connected to the light emitting control signal line EM(i+k) corresponding to the pixel circuits in a lower k-th row. The (M−k+1)-th row of pixel circuits 20 to the M-th row of pixel circuits 20 are electrically connected to the k light emitting control signal lines EM near the lower edge of the display panel respectively. One row of pixel circuits 20 is electrically connected to one light emitting control signal line EM.

In one embodiment, the k-th light emitting control signal line EM to the first light emitting control signal line EM near the lower edge of the display panel are sequentially arranged along the first direction Y1 pointing from the upper edge to the lower edge of the display panel. The bias compensation module in the pixel circuit 20 in the M-th row may be electrically connected to the first light emitting control signal line EM. The bias compensation module in the pixel circuit 20 in the (M−1)-th row may be electrically connected to the second light emitting control signal line EM . . . . The bias compensation module in the (M−k+1)-th row of pixel circuits 20 may be electrically connected to the k-th light emitting control signal line EM.

In this way, through the at least k additional light-emitting control signal lines EM, the last k rows of pixel circuits may be provided with the first periodic signals required by the bias compensation modules. Accordingly, the bias state of the threshold voltage of the driving modules in the last k rows of pixel circuits may be adjusted, and the display uniformity of the display panel may be improved.

The inventors of the present disclosure further found that, the at least k additional light-emitting control signal lines EM are not electrically connected to the light emitting control module in the pixel circuit 20, while other light emitting control signal lines EM are electrically connected to the light emitting control module in the pixel circuit 20. Accordingly, loads of the at least k additional light-emitting control signal lines EM may be different from loads of other light-emitting control signal lines EM in the display panel. As such, adjustment effects of the bias states of the threshold voltages of the driving modules in different rows of pixel circuits may be different, and thus display effects may thus be different.

Figure 24:
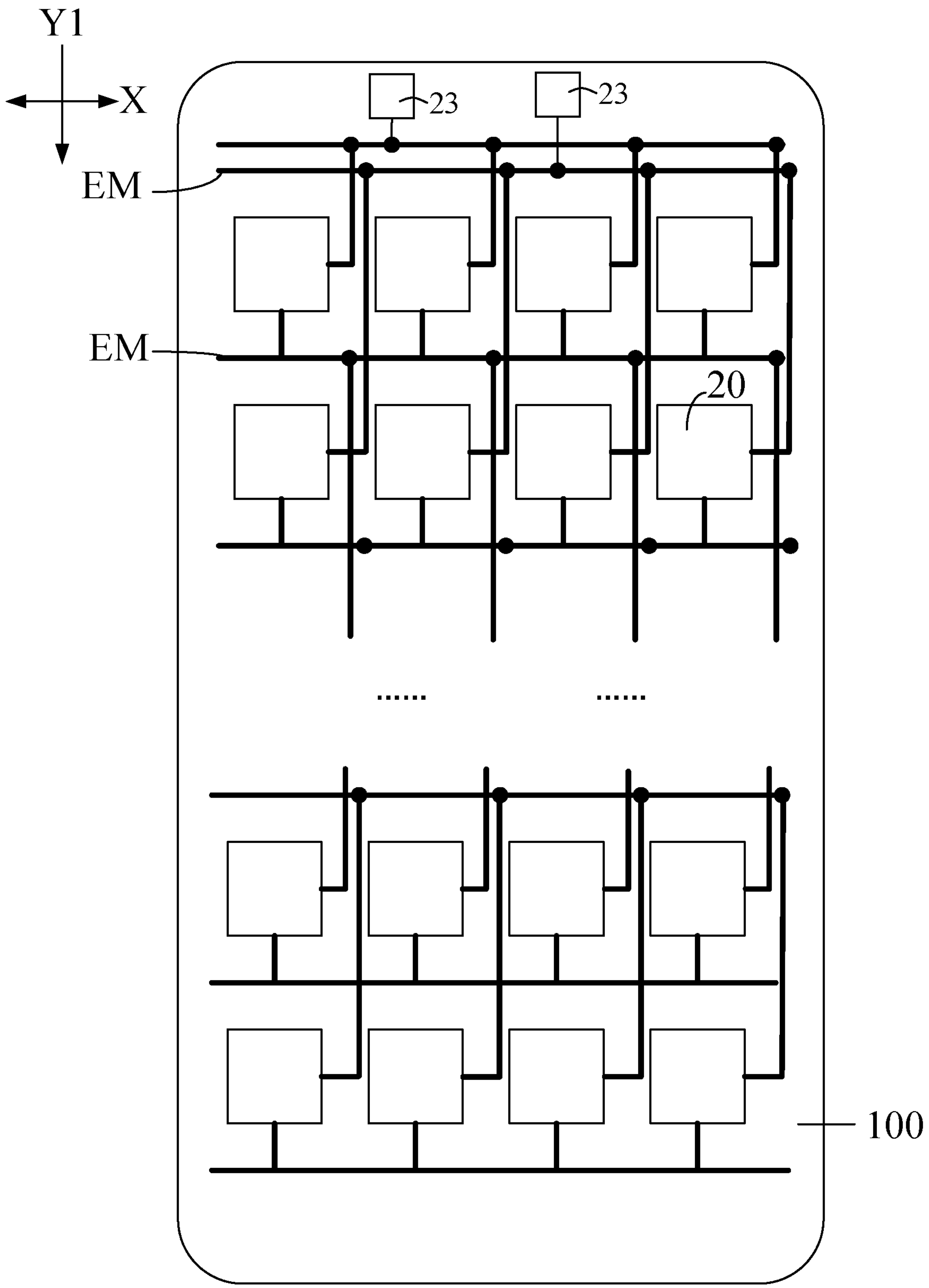
FIG. 24 illustrates another schematic structural diagram of a display panel consistent with the disclosed embodiments of the present disclosure.

FIG. 24 illustrates another schematic structural diagram of a display panel consistent with the disclosed embodiments of the present disclosure. As shown in FIG. 24, in one embodiment, the display panel 100 may also include an impedance compensation module 23. The impedance compensation module 23 may be electrically connected to the at least k light emitting control signal lines EM near the first edge B1 of the display panel. That is, the impedance compensation module 23 may be electrically connected to the at least k additional light emitting control signal lines EM. The impedance compensation module 23 is configured to compensate the loads of the at least k additional light emitting control signal lines EM. Exemplarily, the impedance compensation module 23 includes but not limited to a resistor or a capacitor.

In this way, the loads of the at least k additional lighting control signal lines EM may be compensated by the impedance compensation module 23. Accordingly, the difference between the loads of the at least k additional light emitting control signal lines EM and the loads of other light emitting control signal lines EM in the display panel may be reduced. As such, adjustment effects of the bias states of the threshold voltages of the driving modules in different rows of pixel circuits may be same or similar, and display effects of the display panel may thus be improved.

In some embodiments, for the at least k additional light emitting control signal lines EM, one light emitting control signal line EM may be connected to at least one impedance compensation module 23 correspondingly. Impedances of the impedance compensation modules 23 connected to different lighting control signal lines EM may be same. The present disclosure does not limit whether the impedances of the impedance compensation modules 23 connected to different lighting control signal lines EM are same.

Figure 25:
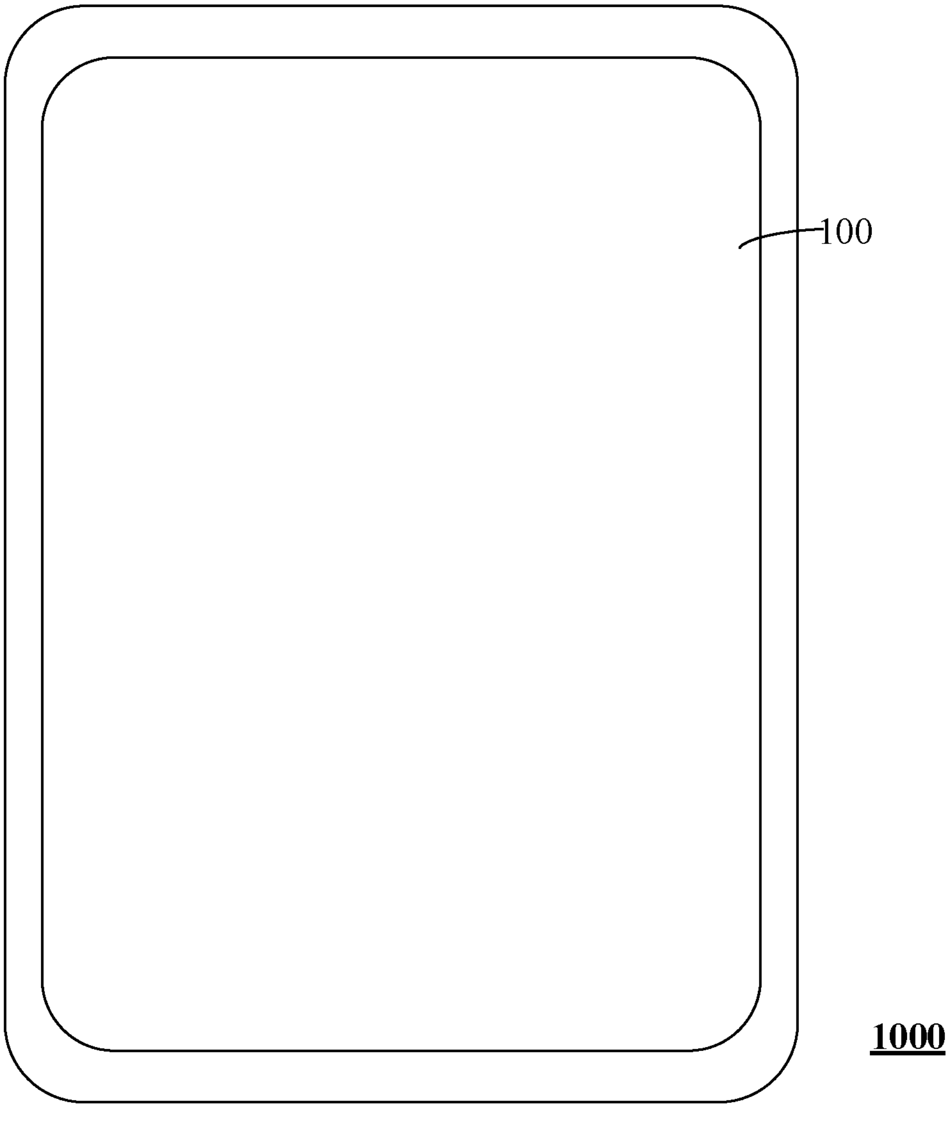
FIG. 25 illustrates a schematic structural diagram of a display device consistent with the disclosed embodiments of the present disclosure.

The present disclosure also provides a display device. The display device includes a display panel provided by the present disclosure. FIG. 25 illustrates a schematic structural diagram of a display device consistent with the disclosed embodiments of the present disclosure. As shown in FIG. 25, the display device 1000 includes the display panel 100 provided by the present disclosure. In FIG. 25, a mobile phone is used as an example to illustrate the display device 1000. It may be understood that the display devices provided by the present disclosure may be wearable products, computers, televisions, vehicle-mounted display devices and other display devices with display functions. The present disclosure does not specifically limit types of the display device. The display device provided by the present disclosure may have the beneficial effects of the display panel 100 provided by the present disclosure. For details, reference may be made to specific descriptions of the display panel 100 in the present disclosure, and the present disclosure will not go into details here.

As disclosed, the technical solutions of the present disclosure have the following advantages.

For the pixel circuit, display panel and display device provided by the present disclosure, on the one hand, the bias compensation module may transmit the first periodic signal of the target signal line to the first terminal of the driving module or the second terminal of the driving module. The potential difference between the second terminal of the drive module and the control terminal may be improved, the ion polarization level inside the drive module may be weakened, the threshold voltage of the driving module may be reduced, and the bias state of the threshold voltage of the driving module may be adjusted. On the other hand, the target signal line may provide the first periodic signal. When adjusting the threshold voltage of the driving module, a voltage signal of any voltage value in the first periodic signal or a combination of a plurality of voltage signals with different voltage values may be selected to adjust the threshold voltage of the driving module. Accordingly, adjustment requirements of the threshold voltage of the driving module in different situations may be met.

The embodiments disclosed herein are exemplary only and not limiting the scope of the present disclosure. Various combinations, alternations, modifications, equivalents, or improvements to the technical solutions of the disclosed embodiments may be obvious to those skilled in the art. Without departing from the spirit and scope of this disclosure, such combinations, alternations, modifications, equivalents, or improvements to the disclosed embodiments are encompassed within the scope of the present disclosure.

What is claimed is:

1. A pixel circuit, comprising:

a driving module;

a bias compensation module, wherein a control terminal of the bias compensation module is electrically connected to a first control signal line, a first terminal of the bias compensation module is electrically connected to a target signal line, a second terminal of the bias compensation module is electrically connected to a first terminal of the driving module or a second terminal of the driving module, and the target signal line is electrically connected to a first periodic signal;

a first reset module, wherein a control terminal of the first reset module is electrically connected to a first scan control signal line, a first terminal of the first reset module is electrically connected to a first reference voltage signal line, and a second terminal of the first reset module is electrically connected to a first node; and a threshold compensation module, wherein a control terminal of the threshold compensation module is electrically connected to a third scan control signal line, a first terminal of the threshold compensation module is electrically connected to the first node, and a second terminal of the threshold compensation module is electrically connected to the second terminal of the driving module, wherein:

the first reset module and the threshold compensation module each include an N-type transistor.

2. The pixel circuit according to claim 1, further comprising:

a first bias compensation phase and a second bias compensation phase, wherein:

in the first bias compensation phase and the second bias compensation phase, the bias compensation module is turned on; and polarities and/or amplitudes of the first periodic signal in the first bias compensation phase and the second bias compensation phase are different.

3. The pixel circuit according to claim 1, further comprising:

a first bias compensation phase and a second bias compensation phase, wherein:

in the first bias compensation phase and the second bias compensation phase, the bias compensation module is turned on; and polarities of the first periodic signal in the first bias compensation phase and the second bias compensation phase are same.

4. The pixel circuit according to claim 1, further comprising:

a light emitting control signal line and a scan control signal line, wherein the target signal line multiplexes the scan control signal line; or the light emitting control signal line of a non-self pixel circuit of the pixel circuit.

5. The pixel circuit according to claim 4, further comprising:

a first reset module and a data writing module, wherein:

a control terminal of the first reset module is electrically connected to a first scan control signal line, and a control terminal of the data writing module is electrically connected to a second scan control signal line;

the target signal line multiplexes the light emitting control signal line of a non-self pixel circuit of the pixel circuit; and a signal period of the light emitting control signal line is same as a signal period of the first scan control signal line and/or the second scan control signal line.

6. The pixel circuit according to claim 1, wherein the first node is electrically connected to a control terminal of the driving module, and the first control signal line multiplexes the first scan control signal line.

7. The pixel circuit according to claim 1, further comprising:

a first bias compensation phase and a second bias compensation phase, wherein in the first bias compensation phase and the second bias compensation phase, the bias compensation module is turned on;

a data writing module, wherein a control terminal of the data writing module is electrically connected to a second scan control signal line, a first terminal of the data writing module is electrically connected to a data signal line, and a second terminal of the data writing module is electrically connected to the first terminal of the driving module; and a first data writing phase and a second data writing phase, wherein in the first data writing phase and the second data writing phase, the data writing module is turned on, writing data signals of the data signal line into the first terminal of the driving module, wherein the first data writing phase is located between the first bias compensation phase and the second bias compensation phase, and the second bias compensation phase is located between the first data writing phase and the second data writing phase.

8. The pixel circuit according to claim 1, further comprising:

a first reset module and a data writing module, wherein:

a control terminal of the first reset module is electrically connected to a first scan control signal line;

a control terminal of the data writing module is electrically connected to a second scan control signal line, a first terminal of the data writing module is electrically connected to a data signal line, and a second terminal of the data writing module is electrically connected to the first terminal of the driving module; and the target signal line multiplexes the first scan control signal line or the second scan control signal line.

9. The pixel circuit according to claim 8, wherein:

the target signal line multiplexes the second scan control signal line; and in at least one data writing phase of a data writing phase, the bias compensation module is turned on, the data writing module is turned on, and a voltage value of a second scan control signal provided by the second scan control signal line is same as a voltage value of a data signal provided by the data signal line.

10. The pixel circuit according to claim 1, wherein:

the bias compensation module includes an N-type transistor; and the first control signal line multiplexes the first scan control signal line or the third scan control signal line.

11. The pixel circuit according to claim 1, further comprising:

a data writing module, wherein a control terminal of the data writing module is electrically connected to a second scan control signal line, a first terminal of the data writing module is electrically connected to a data signal line, and a second terminal of the data writing module is electrically connected to the first terminal of the driving module, wherein:

the bias compensation module and the data writing module each include a P-type transistor; and the first control signal line multiplexes the second scan control signal line.

12. A display panel, comprising:

a plurality of rows of pixel circuits, wherein each row of the plurality of rows of pixel circuits includes a pixel circuit, wherein the pixel circuit includes:

a driving module;

a bias compensation module, wherein a control terminal of the bias compensation module is electrically connected to a first control signal line, a first terminal of the bias compensation module is electrically connected to a target signal line, a second terminal of the bias compensation module is electrically connected to a first terminal of the driving module or a second terminal of the driving module, and the target signal line is electrically connected to a first periodic signal;

a first reset module, wherein a control terminal of the first reset module is electrically connected to a first scan control signal line, a first terminal of the first reset module is electrically connected to a first reference voltage signal line, and a second terminal of the first reset module is electrically connected to a first node; and a threshold compensation module, wherein a control terminal of the threshold compensation module is electrically connected to a third scan control signal line, a first terminal of the threshold compensation module is electrically connected to the first node, and a second terminal of the threshold compensation module is electrically connected to the second terminal of the driving module, wherein:

the first reset module and the threshold compensation module each include an N-type transistor.

13. The display panel according to claim 12, wherein:

the display panel includes M rows of pixel circuits and N light emitting control signal lines, a light emitting control signal line of the N light emitting control signal lines corresponds to a row of pixel circuits of the M rows of pixel circuits, the light emitting control signal line is electrically connected to a light emitting control module in the pixel circuit, wherein N and M are positive integers, with N>M; and the target signal line connected to the bias compensation module in an i-th row of pixel circuits of the M rows of pixel circuits multiplexes the light emitting control signal line correspondingly connected to a j-th row of pixel circuits of the M rows of pixel circuits, where i and j are positive integers, with i≠j, 1≤i≤M, and 1≤j≤M.

14. The display panel according to claim 13, wherein:

the j-th row of pixel circuits and the i-th row of pixel circuits are separated by k rows of pixel circuits of the M rows of pixel circuits, where k is a positive integer.

15. The display panel according to claim 14, wherein:

along a first direction pointing from a first edge to a second edge of the display panel, a first row of pixel circuits to an M-th row of pixel circuits are arranged in sequence, and the j-th row of pixel circuits is on a side of the i-th row of pixel circuits close to the first edge.

16. The display panel according to claim 15, wherein:

N≥M+k;

the light emitting control signal lines extend along a second direction, and along the first direction pointing from the first edge to the second edge of the display panel, a first light emitting control signal line to an N-th light emitting control signal line are sequentially arranged, and the first direction intersects the second direction; and at least k light emitting control signal lines near the first edge of the display panel are not electrically connected to the light emitting control modules in the pixel circuits, and the first row of pixel circuits to a k-th row of pixel circuits are electrically connected to k light emitting control signal lines of the at least k light emitting control signal lines near the first edge of the display panel respectively, wherein one row of pixel circuits is electrically connected to one light emitting control signal line; or at least k light emitting control signal lines near the second edge of the display panel are not electrically connected to the light emitting control modules in the pixel circuits, and an (M-k+1)-th row of pixel circuits to the M-th row of pixel circuits are electrically connected to k light emitting control signal lines of the at least k light emitting control signal lines near the second edge of the display panel respectively, wherein one row of pixel circuits is electrically connected to one light emitting control signal line.

17. The display panel according to claim 16, further comprising:

an impedance compensation module, wherein the impedance compensation module is electrically connected to the at least k light emitting control signal lines near the first edge of the display panel.

18. The display panel according to claim 17, wherein:

a light emitting control signal line of the at least k additional light emitting control signal lines is electrically connected to at least one impedance compensation module of the impedance compensation module.

19. A display device, comprising a display panel, wherein:

the display panel includes a plurality of rows of pixel circuits, and each row of the plurality of rows of pixel circuits includes a pixel circuit, wherein the pixel circuit includes:

a driving module;

a bias compensation module, wherein a control terminal of the bias compensation module is electrically connected to a first control signal line, a first terminal of the bias compensation module is electrically connected to a target signal line, a second terminal of the bias compensation module is electrically connected to a first terminal of the driving module or a second terminal of the driving module, and the target signal line is electrically connected to a first periodic signal;

a first reset module, wherein a control terminal of the first reset module is electrically connected to a first scan control signal line, a first terminal of the first reset module is electrically connected to a first reference voltage signal line, and a second terminal of the first reset module is electrically connected to a first node; and a threshold compensation module, wherein a control terminal of the threshold compensation module is electrically connected to a third scan control signal line, a first terminal of the threshold compensation module is electrically connected to the first node, and a second terminal of the threshold compensation module is electrically connected to the second terminal of the driving module, wherein:

the first reset module and the threshold compensation module each include an N-type transistor.

* * * * *